(12) United States Patent
Thunhorst et al.

(10) Patent No.: US 6,984,429 B2
(45) Date of Patent: Jan. 10, 2006

(54) LAMINATE FROM WHICH DECORATIVE FILMS CAN BE APPLIED TO A SUBSTRATE

(75) Inventors: Kristin L. Thunhorst, Stillwater, MN (US); James F. Pitzen, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 220 days.

(21) Appl. No.: 10/279,334

(22) Filed: Oct. 24, 2002

(65) Prior Publication Data

US 2003/0041961 A1   Mar. 6, 2003

Related U.S. Application Data

(63) Continuation-in-part of application No. 10/004,727, filed on Dec. 5, 2001, now Pat. No. 6,773,537, which is a continuation-in-part of application No. 09/759,795, filed on Jan. 12, 2001, now Pat. No. 6,571,849.

(51) Int. Cl.
*B32B 3/24* (2006.01)

(52) U.S. Cl. .................. 428/41.8; 428/40.2; 428/41.2; 428/41.6; 428/41.7; 428/41.9; 428/343; 428/354; 428/201; 428/202; 428/203; 428/914

(58) Field of Classification Search .............. 428/40.1, 428/40.2, 41.2, 41.6, 41.7, 41.8, 41.9, 42.1, 428/343, 354, 201, 202, 203, 914
See application file for complete search history.

(56) References Cited

U.S. PATENT DOCUMENTS

| | | |
|---|---|---|
| 3,967,021 A | 6/1976 | Weingrad |
| 4,012,552 A | 3/1977 | Watts |
| 4,192,905 A | 3/1980 | Scheibal |
| 4,285,752 A | 8/1981 | Higgins |
| 4,294,644 A | 10/1981 | Anderson |
| 4,557,790 A | 12/1985 | Wisbey |
| 4,813,571 A | 3/1989 | Slagter |
| 4,961,816 A | 10/1990 | Lisec |
| 4,968,562 A | 11/1990 | Delgado |
| 4,978,417 A | 12/1990 | Grimshaw et al. |
| 4,981,545 A | 1/1991 | Shinno et al. |
| 4,994,322 A | 2/1991 | Delgado et al. |

(Continued)

FOREIGN PATENT DOCUMENTS

DE   43 04 825 A1   8/1994

(Continued)

OTHER PUBLICATIONS

Brochure by 3M, "Accentrim™ Products", 1999.

(Continued)

*Primary Examiner*—Linda Gray
(74) *Attorney, Agent, or Firm*—William L. Huebsch

(57) ABSTRACT

A laminate from which decorative films can be precisely applied to a substrate. The laminate includes a polymeric cover sheet having opposite outer and inner major surfaces. A layer of structured pressure sensitive adhesive is adhered to the inner major surface of the cover sheet. The structured pressure sensitive adhesive has a plurality of spaced passageways extending to at least one edge of the layer of structured pressure sensitive adhesive. A decorative film is adhered to the structured pressure sensitive adhesive. A second layer of pressure sensitive adhesive is adhered to the major surfaces of the decorative film opposite the layer of structured pressure sensitive adhesive. A release liner extends substantially across the second layer of pressure sensitive adhesive and a portion of the structured pressure sensitive adhesive.

11 Claims, 16 Drawing Sheets

U.S. PATENT DOCUMENTS

| | | | |
|---|---|---|---|
| 5,011,563 | A | 4/1991 | Shinno et al. |
| 5,072,359 | A | 12/1991 | Kneifel, II |
| 5,114,519 | A | 5/1992 | Grimshaw et al. |
| 5,141,790 | A | 8/1992 | Calhoun et al. |
| 5,296,277 | A | 3/1994 | Wilson et al. |
| 5,346,350 | A | 9/1994 | Luhman et al. |
| 5,356,505 | A | 10/1994 | Salvatore |
| 5,362,516 | A | 11/1994 | Wilson et al. |
| 5,370,754 | A | 12/1994 | Soloman |
| 5,441,846 | A | 8/1995 | Nagate et al. |
| 5,458,726 | A | 10/1995 | Castoldi |
| 5,480,508 | A | 1/1996 | Manabe et al. |
| 5,482,593 | A | 1/1996 | Kuhn et al. |
| 5,536,044 | A | 7/1996 | Luhman et al. |
| 5,665,446 | A | 9/1997 | Sundet |
| 5,714,028 | A | 2/1998 | Horai et al. |
| 5,749,994 | A | 5/1998 | Sundet |
| 5,795,636 | A | 8/1998 | Keller et al. |
| 5,840,407 | A | 11/1998 | Futhey et al. |
| 5,882,774 | A | 3/1999 | Jonza et al. |
| 6,030,475 | A | 2/2000 | Spotts, Jr. |
| 6,066,218 | A | 5/2000 | Kuhn et al. |
| 6,180,196 | B1 | 1/2001 | Glover et al. |
| 6,197,397 | B1 | 3/2001 | Sher et al. |
| 6,354,739 | B1 | 3/2002 | Sheehan, Jr. et al. |
| 6,524,649 | B1 | 2/2003 | Sher et al. |
| 2002/0048663 | A1 | 4/2002 | Ueno et al. |
| 2002/0092593 | A1 | 7/2002 | Erickson |
| 2002/0092608 | A1 | 7/2002 | Erickson et al. |

FOREIGN PATENT DOCUMENTS

| | | |
|---|---|---|
| EP | 0 076 593 | 4/1983 |
| EP | 0 286 343 A2 | 10/1988 |
| EP | 0 570 515 B1 | 6/1996 |
| EP | 0 617 708 B1 | 9/1996 |
| EP | 0 911 263 A2 | 4/1999 |
| JP | 07-101618 | 4/1995 |
| JP | 9-138647 | 5/1997 |
| JP | 11-334981 | 12/1999 |
| JP | 2000-313562 | 11/2000 |
| WO | WO 92/13924 A1 | 8/1992 |
| WO | WO 93/12147 A1 | 6/1993 |
| WO | WO 02/13980 A1 | 2/2002 |

OTHER PUBLICATIONS

Operating Instructions, 3M M45 Precision Cutter, Type 19900, 1999.

Satas, et al., Handbook of Pressure Sensitive Adhesives, 2nd Ed., Von Nostrand Reinhold, N.Y., (1989).

U.S. Appl. No. 09/761,797, filed Jan. 17, 2001, Method for Applying Designs to a Substrate.

U.S. Appl. No. 10/167,347, filed Jun. 11, 2002, Method of Conforming an Adherent Film to a Substrate by Application of Vacuum.

LAMINATE FROM WHICH DECORATIVE FILMS CAN BE APPLIED TO A SUBSTRATE

RELATED APPLICATIONS

This is a continuation in part of U.S. patent application Ser. No. 10/004,727 filed Dec. 5, 2001, issued as U.S. Pat. No. 6,773,537, which is a continuation-in-part of U.S. patent application Ser. No. 09/759,795 filed Jan. 12, 2001, issued as U.S. Pat. No. 6,571,849.

FIELD OF THE INVENTION

The present invention relates to methods and assemblies for applying adhesive coated decorative objects to substrates such as sheets of glass.

BACKGROUND OF THE INVENTION

U.S. Pat. No. 5,665,446 describes a method for applying pressure-sensitive adhesive coated graphics to a substrate (e.g., a sheet of glass) using a layer of pre-mask material comprising a polymeric cover sheet or layer and a layer of removable pressure-sensitive adhesive firmly adhered to one surface of the cover sheet with the layer of pre-mask material being vented. Generally that method includes the steps of adhering surfaces of the graphics opposite their layers of pressure-sensitive adhesive to the layer of pressure-sensitive adhesive on the layer of pre-mask material, using a wetting liquid to wet the graphics, the layer of pre-mask material and the substrate; placing the graphics adhered to the layer of pre-mask material at a desired location on the substrate; pressing out air and water from between the substrate and the graphics adhered to the layer of pre-mask material; allowing the wetting liquid to dry through the vents; and removing the layer of pre-mask material to leave the graphics adhered to the substrate.

U.S. Pat. No. 5,840,407 describes pieces of optical film, each of which pieces has a layer of pressure-sensitive adhesive along one surface, and an opposite outer major surface (e.g., a grooved and/or vapor coated surface) so that the pieces visually simulate decorative glass such as glass with beveled edges, or with a groove along its length, or with a leaded appearance, or with a textured surface, or visually simulate glass related structures such as metal came. Such pieces of optical film have been applied to substrates (e.g., window panes) in predetermined patterns using automated application equipment, however, heretofore it has been very difficult for persons such as homeowners to apply such optical film on windows or other glass substrates with the precision needed so that it provides the desired visual simulation. U.S. Patent Application Publication No. US 2003/0211267 A1 published Nov. 13, 2003, describes a method for persons such as homeowners to apply to a substrate (e.g., a sheet of glass in a window or mirror) decorative designs made using separate pieces of optical film of the type described in U.S. Pat. No. 5,840,407, each of which pieces has a layer of adhesive along one surface, and an opposite outer major structured surface (e.g., a surface that is grooved and/or vapor coated) so that the pieces visually simulate decorative structures such as glass with beveled edges, or with a groove along its length, or with a leaded appearance, or with a textured surface, or glass related structures such as metal came. Generally, that method comprises the steps of (1) providing a kit including a layer of pro-mask material that is at least translucent comprising a cover sheet with a layer of removable adhesive (e.g., pressure-sensitive adhesive) firmly adhered to one surface; a predetermined printed design; and pieces of optical film having peripheral shapes that correspond to parts of the printed design, each of which pieces of optical film have a layer of adhesive (e.g., pressure-sensitive adhesive) along one surface, and an opposite outer major surface (e.g., a grooved and/or vapor coated surface) so that the pieces visually simulate decorative structures; (2) placing the pieces of optical film over portions of the design corresponding to their shapes with the outer major surfaces of the pieces of film along a common plane; (3) adhering the layer of adhesive on the layer of pre-mask material to the outer major surfaces of the pieces of film; (4) plating the pieces of optical film adhered to the layer of adhesive on the layer of pre-mask material at a desired location on the substrate, (5) pressing the layer of pre-mask material and thereby the pieces of optical film adhered to the layer of pre-mask material against the substrate, during which pressing step the layer of pre-mask material protects the outer major surfaces of the pieces of film from damage; and (6) removing the layer of pre-mask material to leave the pieces of optical film adhered to the substrate in the predetermined design. Preferably the layer of pre-mask material is or has been made transmissive of moisture vapor (e.g., a layer of pre-mask material that is vented as described in U.S. Pat. No. 5,665,446), a wetting liquid is used to wet the pieces of optical film, the layer of pre-mask material and the substrate prior to the step of placing the pieces of optical film adhered to the layer of adhesive on the layer of pre-mask material at a desired location on the substrate, which wetting liquid is allowed to dry between that step and the step of removing the layer of pre-mask material.

BRIEF SUMMARY OF THE INVENTION

The present invention is directed to a laminate from which decorative films can be precisely applied to a substrate. The laminate includes a polymeric cover sheet having opposite outer and inner major surfaces. A layer of structured pressure sensitive adhesive is adhered to the inner major surface of the cover sheet. The structured pressure sensitive adhesive has a plurality of spaced passageways extending to at least one edge of the layer of structured pressure sensitive adhesive. A decorative film is adhered to the structured pressure sensitive adhesive. A second layer of pressure sensitive adhesive is adhered to the major surfaces of the decorative film opposite the layer of structured pressure sensitive adhesive. A release liner extends substantially across the first and second layers of pressure sensitive adhesive.

The structured pressure sensitive adhesives are adapted to be made wet during application of the decorative film to a substrate with a liquid that lubricates the adhesives so that the decorative film can be applied to a substrate at a precise position. A variety of aqueous or solvent based lubricating liquids can be used. A large portion of the lubricating liquid is expelled from between the substrate and the decorative film by pressure and/or evaporation through the passageways to leave the decorative film firmly adhered to the substrate at the position.

The decorative film can be a film filled with light-diffusing agents to give an etched or sand-blasted appearance to the decorative film when they are adhered by the second layer of pressure-sensitive adhesive to a glass panel. The film can also have light diffusing features that provide a beveled or v-groove appearance when adhered to glass. Preferably, the decorative film is a structured film which provides the optical appearances of cut glass, such as described in U.S. Pat. No. 5,840,407. The structured pressure sensitive adhesive is preferably selected to form a bond to the decorative film that permits the low-adhesion release liner to be peeled away without disrupting that bond. Once the installation process is completed, the cover sheet can be peeled cleanly from the decorative film without disrupting the adhesive bond between the decorative film and a substrate. In one embodiment, the cover sheet is an opaque material.

The present invention is also directed to a laminate adapted for use to decorate a substrate. The laminate includes a layer of pre-mask material comprising a cover layer and a layer of removable structured pressure sensitive adhesive firmly adhered to one surface of the cover layer. Display lengths of decorative film are provided having opposite major surfaces and a layer of adhesive along one of the major surfaces. A release liner is releasably adhered to the pre-mask by the removable structured pressure sensitive adhesive on the cover layer and by the adhesive on the decorative film.

In one embodiment, the display lengths of decorative film have different predetermined shapes and lengths formed by a computer operated tape applicator that are applied to the first surface of the release liner by the tape applicator in a predetermined pattern. The display lengths can also be prepared manually. The layer of removable structured pressure sensitive adhesive is adhered over the outer major surfaces of the display lengths of decorative film adhered to the release liner and to the release liner around the display lengths of decorative film.

The present invention is also directed to a method for making a laminate adapted for use to decorate a substrate. The method includes the steps of providing a layer of pre-mask material comprising a cover layer and a layer of removable structured pressure sensitive adhesive firmly adhered to one surface of the cover layer. A supply length of decorative film is provided. The decorative film has an adhesive along a second major surface. A release liner having opposite first and second major surfaces is also provided. The first major surface of the release liner is adapted to be releasably adhered to by the removable structured pressure sensitive adhesive on the cover layer and by the adhesive on the decorative film.

In one embodiment, a tape applicator is provided that is adapted to form display lengths of tape of different lengths and end shapes from the supply length of tape and to apply the display lengths of the tape at different precise locations on a surface along an application plane with longitudinal edges of the display lengths of tape extending along predetermined edge locations. The release liner is supported with the first major surface in the application plane. This process can also be performed manually.

The tape applicator forms display lengths of decorative film of predetermined shapes and lengths from the supply length of decorative film and applies those display lengths of decorative film to the first surface of the release liner in a predetermined pattern with longitudinal edges of the display lengths of tape extending along predetermined edge locations. The layer of removable structured pressure sensitive adhesive is adhered to the first major surfaces of the display lengths of decorative film and to the release liner around the display lengths of decorative film.

In another embodiment, the display lengths of tape can be applied via a tape applicator (or manually) directly to the structured pressure sensitive adhesive of the pre-mask. The layer of release liner is subsequently applied over the pressure sensitive adhesive and the structured pressure sensitive adhesive.

In one embodiment, the method includes the steps of removing the release liner from the layers of adhesive included in the display lengths of decorative film and from the removable structured pressure sensitive adhesive included in the layer of pre-mask material. The layers of adhesive included in the display lengths of decorative film and in the layer of pre-mask material are placed on a substrate with the display lengths of decorative film at a desired location along the substrate. Air is pressed out from between the layers of adhesive included in the display lengths of decorative film and the substrate. The pre-mask material is removed to expose the display lengths of decorative film adhered to the substrate.

In another embodiment, a lubricating liquid is used to wet the substrate and/or the layers of adhesive included in the display lengths of decorative film and the layer of structured adhesive on the pre-mask material and the substrate before the step of placing the layers of adhesive included in the display lengths of decorative film and the layer of pre-mask material on the substrate. A portion of the lubricating liquid and/or entrained air is pressed out from between the layers of adhesive included in the display lengths of decorative film and the substrate. Most of the remaining lubricating liquid is allowed to evaporate before the step of removing the layer of pre-mask material.

BRIEF DESCRIPTION OF THE SEVERAL VIEWS OF THE DRAWING

The present invention will be further described with reference to the accompanying drawing wherein like reference numerals refer to like parts in the several views, and wherein:

FIG. 21 is a top view of a second discrete length of tape applied to the release liner illustrated in FIGS. 19 and 20 over the top of the first discrete length of decorative film tape after the scrap portion of that first discrete length of decorative film tape has been removed as illustrated FIG. 20, which FIG. 21 illustrates a sequence of cuts that can be made in the second discrete length of tape by the second cutter of the tape head.

DETAILED DESCRIPTION OF THE INVENTION

Figure 1:
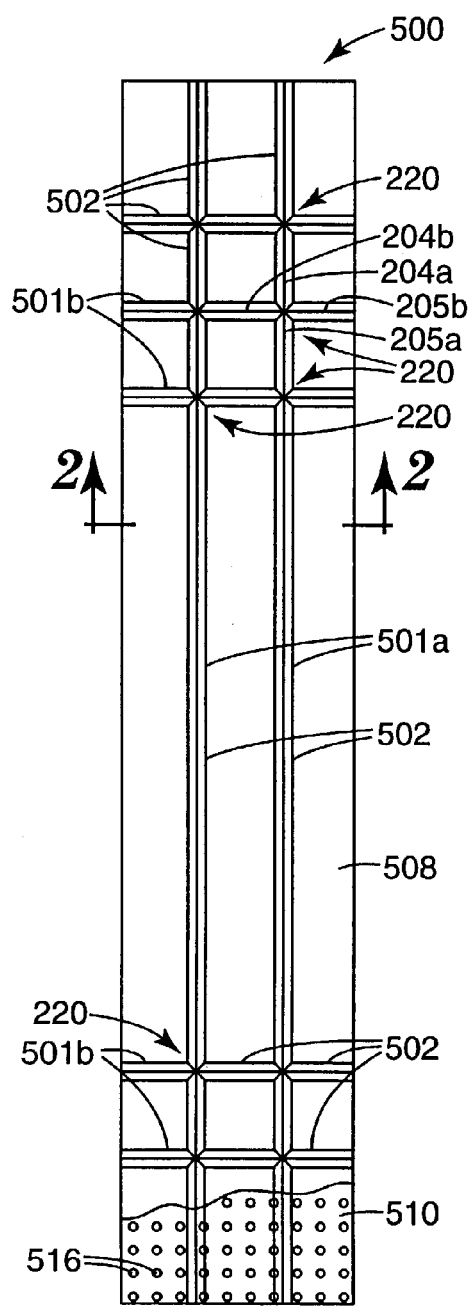
FIG. 1 illustrates a first embodiment of a laminate made by a method according to the present invention, which laminate is adapted for use to decorate a substrate such as a pane or panes of glass and includes a plurality of display lengths of decorative film tape adhered to a release liner in a predetermined decorative pattern, and a layer of pre-mask material (only a fragment of which is shown) that is adhered over the display lengths of decorative film and to the release liner in areas not covered by the display lengths of decorative film tape.
Figure 2:
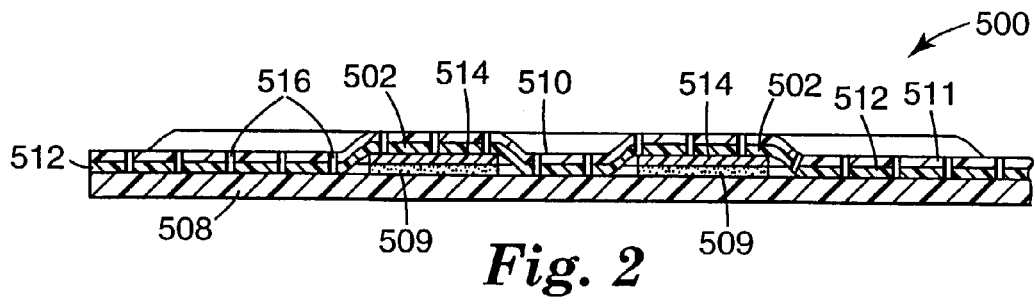
FIG. 2 is an enlarged sectional view taken approximately along line 2—2 of FIG. 1.
Figure 4:
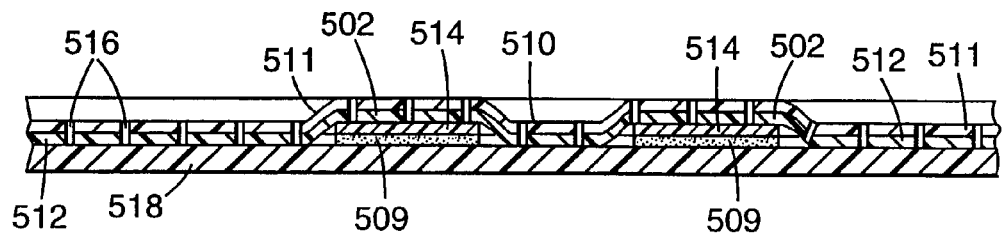
FIG. 4 is an enlarged fragmentary sectional view taken approximately along line 4—4 of FIG. 3.
Figure 3:
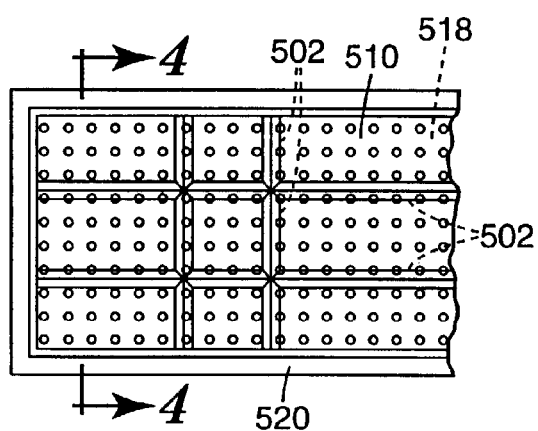
FIG. 3 is a fragmentary plan view of the laminate of FIG. 1 after the release liner has been removed and the display lengths of decorative film tape and the layer of pre-mask material that is adhered over the display lengths of decorative film have been adhered to a substrate.

Referring now to FIGS. 1 and 2 of the drawing there is illustrated a laminate 500 made by a method according to the present invention, which laminate 500 is adapted for use to decorate a substrate such as a pane or panes of glass in a window, a door, or a mirror. The laminate 500 includes a plurality of display lengths 502 of decorative film tape each (see FIG. 2) comprising a length of decorative film 514, which display lengths 502 of decorative film tape are adhered to a major surface of a release liner 508 in a predetermined decorative pattern by layers 509 of pressure sensitive adhesive included in the display lengths 502 of decorative film tape; and a layer of pre-mask material 510 comprising a cover sheet or layer 511 and a layer 512 of removable adhesive firmly adhered to one surface of the cover layer 511 that has its surface opposite the cover layer 511 adhered to outer major surfaces of the display lengths of decorative film 514 opposite the release liner 508, and to the major surface of the release liner 508 in areas not covered by the display lengths 502 of decorative film tape. Only a fragment of the layer of pre-mask material 510 is illustrated in FIG. 1, however that layer of pre-mask material 510 is typically coextensive with the release liner 508 and extends over all of the display lengths 502 of decorative film tape. The pre-mask material 510 can be opaque, translucent or transparent. The layer 512 can optionally be a structured adhesive, as discussed hereinafter.

The release liner 508 to which the display lengths 502 of decorative film tape are adhered is of a polymeric material (e.g., polyester, polyethylene, or polypropylene or other smooth polymer film 0.001 to 0.010 inch or 0.003 to 0.025 cm thick having a release coating (e.g., a coating containing silicone) to provide releasable adhesion with the layers 509 and 512 of adhesive in the display lengths 502 of decorative film tape and in the layer of pre-mask material 510, respectively.

The length of decorative film 514 in each display length 502 of decorative film tape can have grooves, vapor coating and/or other structure along its outer major structured surface opposite the layer 509 of pressure-sensitive adhesive along its other major surface so that the decorative film 514 visually simulates decorative glass, such as glass with a single bevel, beveled edges, or with a central groove along its length (e.g., a V shaped groove), or with a leaded appearance, or with a textured surface, or visually simulate a glass related structure such as metal came (e.g., the pieces of optical film described in U.S. Pat. No. 5,840,407 issued Nov. 24, 1998, the content whereof is hereby incorporated herein by reference). Tapes including a length of the type of optical film disclosed in U.S. Pat. No. 5,840,407 and a layer of pressure sensitive adhesive along one major surface are commercially available as 3M® brand Accentrim™ Tape, series B200 (V-groove tape) and series B100 (edge bevel tape), from 3M Company, St. Paul, Minn.

Other decorative or visibly distinctive films that can be used in the decorative film tape include multi-layer optical films, composite decorated graphics, microreplicated structured graphics, decorative films other than v-groove and edge bevel structures, reflective sheeting and films made with glass beads, and the like. Additional decorative or visibly distinct films include a decorative birefringent multi-layer film is available from 3M Company, St. Paul, Minn., under the trade designation "Radiant Light Film" that is described in U.S. Pat. No. 5,882,774; or the vinyl films also available from 3M Company, that can be applied to glass panes to form graphics that appear to have been etched or sand-blasted into the glass at a fraction of the cost of actual etching or sand blasting. These vinyl films, typically plasticized poly(vinyl chloride), are marketed as Scotchcal® (trade mark) Series 7725 special effects films. Among these, Scotchcal® (trade mark) 7725-314 Dusted Crystal Film gives the appearance of etched glass, and Scotchcal® (trade mark) 7725-324 Frosted Crystal Film gives the decorative appearance of sand-blasted glass. Each of these special effects vinyl films bears a layer of aggressive pressure-sensitive adhesive and a low-adhesion carrier web that protects the adhesive. The pressure-sensitive adhesive is selected to form strong bonds to the substrate 518, such as for example to glass.

Preferably the layer of pre-mask material 510 allows transmission of moisture vapor between its major surfaces by means, including, but not limited to, being vented by passageways 516 through the cover layer 511 and the layer 512 of adhesive between their major surfaces, (e.g., the layer of pre-mask material described in U.S. Pat. No. 5,749,994 issued May 12, 1998, the content whereof is hereby incorporated herein by reference).

Alternatively, the layer of pre-mask material 510, rather than being perforated, could be selected to allow passage of moisture to facilitate drying of a substrate to which the display lengths 502 of decorative film tape are adhered. As used herein, "dry" or "drying" means the elimination of most of the moisture by evaporation. Complete elimination of all moisture is not required. Suitable materials for the cover layers 511 in such layers of pre-mask material (which may not need to be transparent or translucent for some applications) could be polymers, paper, cellulose, non-woven fiber or other woven material; and the layers 512 of removable adhesive could be formed from randomly laid adhesive strands between which strands spaces are left that permit the passage of moisture.

Figure 23:
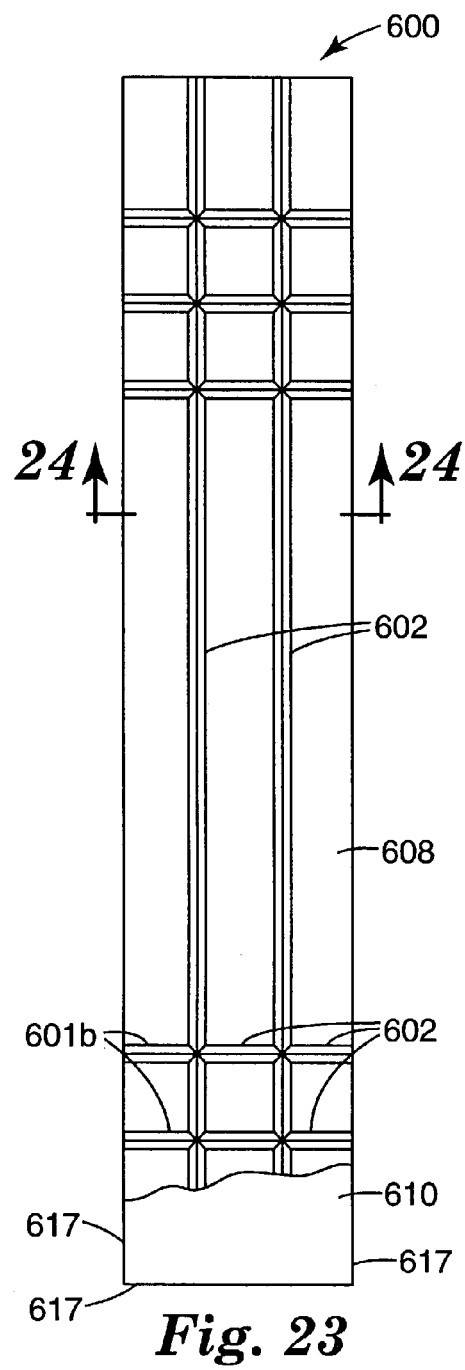
FIG. 23 illustrates an alternate embodiment of a laminate for use to decorate a substrate such as panes of glass, made by a method according to the present invention.
Figure 24:
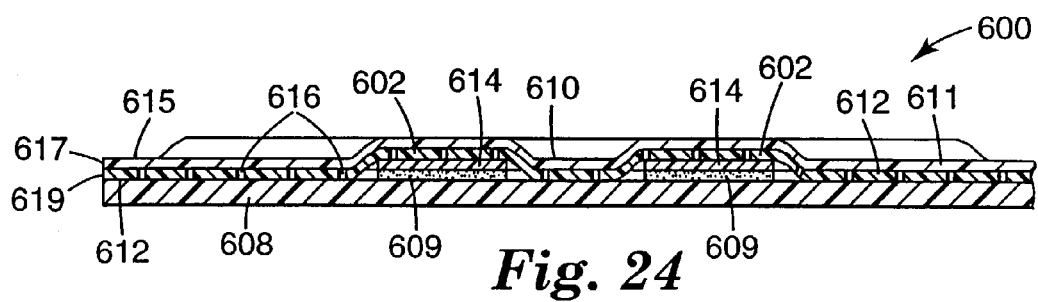
FIG. 24 is a side sectional view illustrating the structured adhesive of the alternate laminate of FIG. 23.

FIGS. 23 and 24 illustrated an alternate laminate 600 made generally by the method of the present invention. As discussed in connection with FIGS. 1 and 2, the laminate 600 includes a plurality of display lengths 602 of decorative film 614.

The decorative film 614 is adhered to the release liner 608 by layers 609 of pressure sensitive adhesive. The pre-mask material 610 includes a structured adhesive 612 firmly adhered to at least a portion of cover layer 611. The structured adhesive 612 is adhered to outer major surfaces of the display lengths 602 of decorative film 614 opposite the release liner 608, and to the portions of the major surface of the release liner 608 not covered by the display lengths 602 of decorative film 614. Only a fragment of the layer of pre-mask material 610 is illustrated in FIG. 23, however that layer of pre-mask material 610 is typically coextensive with the release liner 608 and extends over all of the display lengths 602 of decorative film tape. Optionally, the release liner 608 can be slightly larger than the pre-mask material 610 and the structured adhesive 612.

The structured adhesive 612 is coated, applied and/or processed to have a plurality of passageways or channels 616. At least a portion of the passageways 616 extend to one or more edges 619 of the structured adhesive layer 612. The passageways 616 permit transmission of air and moisture vapor out past the edges 617 of the covering sheet 611.

The passageways 616 may extend the entire thickness of the structured adhesive layer 612, or some portion thereof. That is, the passageways 616 may have a cross-sectional dimension along a z-axis equal to the spacing between the cover sheet 611 and the release liner 608. Alternatively, the passageways 616 have a cross-sectional dimension (e.g., diameter) less than the spacing between the cover sheet 611 and the release liner 608.

In the illustrated embodiment, the pre-mask material 610 is opaque, although transparent or translucent materials can also be used. The thickness of the decorative film 614 creates protrusions or ridges that are visible along the outer major surface 615 of the cover layer 611. Consequently, the user knows the location of the display lengths 602 even though the cover layer 611 is opaque. The outer major surface 615 of the cover layer 611 is preferably printable so that installation instructions and other information can be printed thereon.

For the pre-mask material 610 to function well in this application, the adhesive layer 612 should have aggressive enough adhesion to adhere to the structured surface of the decorative film 614. Some decorative films, such as v-groove tape commercially-available from 3M Company of St. Paul, Minn. under the trade designation B200 Accentrim™, have a significant surface topology which is challenging for pre-mask materials 612 to adhere to. The necessary level of adhesion of the pre-mask to the decorative film 614 is dependent on the type of graphic (surface topology), the type of adhesive on the graphic, and the type of release liner 608 on the laminate 600. The adhesive layer 612 must adhere well enough to effectively permit removal of the decorative film 614 from the release liner 608 prior to the installation process.

The adhesion of the adhesive layer 612 to the decorative film 614 must also be strong enough to withstand the installation process which currently involves contact with a significant amount of soapy water or other lubricating liquid. The pre-mask material 610 should not release from the decorative film 614 until the installation process is complete to prevent misalignment of the display lengths 602. The adhesion must be low enough to permit effective removal of the pre-mask material 610 after the decorative film 614 has been installed on the substrate 518 (window, door, etc) while the display lengths 602 remain attached to the substrate 518. The adhesion of the pre-mask material 610 also should be relatively independent of storage conditions and length of time it is in contact with the decorative film 614.

The passageways 616 can form a regular or an irregular pattern. The passageways can be linear or curved. For example, the passageways 616 can be arranged in a variety of patterns, including regular patterns such as rectangular grid patterns, diamond grid patterns, a plurality of parallel passageways, and combinations thereof Although FIG. 24 illustrates the passageways as being generally rectangular, the actual shape of the passageways may vary depending upon the nature of the adhesive 612 used, the method of applying the adhesive to create the required structure, and a variety of other variables. The cross-sectional shape of the passageways 616 is not critical and can be trapezoidal, triangular, rectangular, spherical, curvilinear or any approximation of these shapes or alternatively, irregular shapes.

Pattern coated adhesives, embossed adhesives, or a variety of other adhesive structures can also be used to form the passageways 616 in the structured adhesive 612. The density of passageways 616 can range from about 3 per centimeter to about 71 per centimeter. In one embodiment, the passageways 616 have a height relative to the liner 608 of about 15 to about 45 micrometers and a width of about 50 micrometers to about 200 micrometers. In this embodiment, the cross-sectional area of the passageways is preferably about 1000 square micrometers to about 10,000 square micrometers.

As used herein, "structured adhesive" refers to an adhesive layer having a plurality of passageways or channels, at least a portion of which extend to an edge thereof. The structured adhesive is typically formed on tooling with structural features that are the mirror image of the desired passageways. Since the structured adhesive can change and flow after leaving the tooling, reference to specific shapes, dimensions and other features of the structured adhesive are typically made with respect to the tooling.

The structured adhesives disclosed in U.S. Pat. No. 6,197,397 (incorporated by reference), assigned to 3M Innovative Properties Company, are suitable for use in the present invention. Another approach to forming a structured adhesive suitable for use in the present invention is disclosed in U.S. Pat. No. 6,524,649 (incorporated by reference) (see also PCT. WO 02/13980), assigned to 3M Innovative Properties Company. This application discloses the use of a structure release liner that embosses its structure into the adhesive layer. When the release liner is removed, the passageways in adhesive layer remain substantially intact. U.S. Patent Application Publication No. US 2003/0226637 A1, published Dec. 11, 2003, (incorporated by reference), assigned to 3M Innovative Properties Company, discloses a variety of structured adhesives.

In addition to groove patterns, passageways can also be provided by discontinuous adhesive layers, provided, for example, by the application of adhesive material in stripes, dots, or other like patterns. Passageways may also be provided by use of adhesive microspheres or nonadhesive particulates incorporated into adhesive layers. Roughened adhesive layers, wherein the adhesive surface contains random bumps or other protrusions of adhesive material, can also provide passageways. Bumps or other protrusions can also be added to adhesive layers by printing or otherwise depositing adhesive or nonadhesive materials onto previously formed adhesive layers or by applying an adhesive over an adhesive or nonadhesive material (which may be in the shape of dots, strings or other types of protrusions).

Passageways may also be provided in the adherent layer by use of open-structured materials such as open structured adhesives and open structured adhesive sublayers. As used herein, the term open structured material refers to a material which, when placed between two surfaces, holds such surfaces apart while also providing an open path suitable for fluid flow between the spaced apart surfaces. Open structures can be provided by, for example, fibrous or porous adhesives. Adhesives provided in the form of blown microfibers can be used to provide an open structured adhesive layer having significant void space for fluid flow. Multi-layer adhesive systems are also contemplated. For example, an open structured sublayer can be attached to a major surface of a film backing, with a porous or otherwise air transmissive adhesive layer attached to the sublayer. This would allow air in interfacial airspaces to flow through the adhesive layer, into the open structured sublayer, and along the sublayer to an edge of the film. Suitable materials for the sublayer include blown microfiber structures and open celled foam materials.

A commercially available structured adhesive is available from 3M Company of St. Paul, Minn. under the trade designation "Comply". A suitable pre-mask 610 with a structured adhesive is available from 3M Company of St. Paul, Minn. under the product designation VCC8198. Non-limiting examples of adhesives that can be used for the present structured adhesive include pressure sensitive adhesives, hot melt or heat activated adhesives that are pressure sensitive at the time of application such as pressure sensitive adhesives disclosed in U.S. Pat. No. 4,994,322 (Delgado et al.); U.S. Pat. No. 4,968,562 (Delgado); EPO Publication 0 570 515; EPO Publication 0 617 708; pressure sensitive adhesives disclosed in U.S. Pat. Nos. 5,296,277 and 5,362,516 (both Wilson et al.) and U.S. Pat. No. 5,141,790 (Calhoun et al.) and U.S. Pat. No. 5,795,636 (Keller et al.), all incorporated by reference and any other type of pressure sensitive adhesive disclosed in Satas, et al., Handbook of Pressure Sensitive Adhesives, 2nd Ed. (Von Nostrand Reinhold, N.Y., 1989), the disclosure of which is incorporated by reference.

The present structured adhesive 612 can be used with a variety of cover layers 611, such as polymers, paper, cellulose, non-woven fiber or other woven materials. In one embodiment, the structured adhesive 612 is used in combination with the perforated cover sheet 511 of FIG. 1.

The laminate 600 is installed using the method discussed in connection with FIGS. 3–6. The passageways 616 in the structured adhesive 612 facilitates the removal of air (and lubricating liquid when used) between the cover layer 611 and the display lengths 602, and the substrate 518 (see FIG. 4). The passageways 616 also facilitate the removal of lubricating liquid vapor during the drying step prior to the removal of the cover sheet 611.

In one embodiment, the laminates 500 and 600 are assembled manually. Various fixtures and/or templates can be used to cut the decorative film to the required lengths and shapes, and to accurately position the decorative film on the release liner and/or the pre-mask. For example, the fixtures and/or templates can be used to position the decorative film in the desired configuration prior to attaching the release liner and/or the pre-mask. In one embodiment, the assembly of pre-mask, decorative film, release liner and adhesive layers is removed from the fixture and/or template and laminated using heat and/or pressure. In another embodiment, the assembly can be laminated while still located on the fixture and/or template.

Generally, the method according to the present invention for making the laminates 500 and 600 can comprise using a tape applicator 10 shown in FIGS. 8 through 18. To simplify the discussion of the present method, reference will be made to the laminate 500, although the method is equally applicable to the laminate 600.

FIGS. 8 through 18 teach a method to form and apply the display lengths 502 of decorative film tape to the surface of the release liner 508 in the predetermined pattern, and then adhering the layer of removable adhesive 512 included in the layer of pre-mask material 510 over the outer major surfaces of the display lengths 502 of decorative film tape adhered to the to the release liner 508 and to the portions of the release liner 508 around those display lengths 502 of decorative film tape which can be done manually or with a laminating machine.

Figure 5:
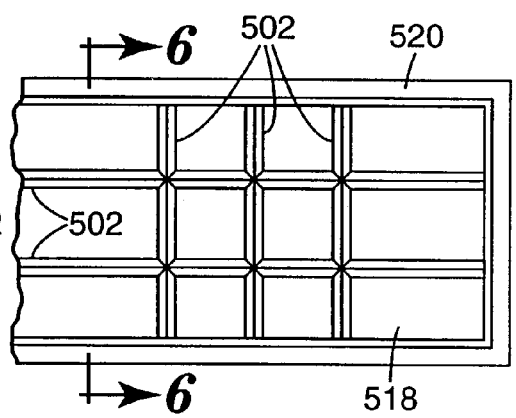
FIG. 5 is a fragmentary plan view of the display lengths of decorative film tape in the laminate of FIG. 1 after they have been applied to the substrate and the overlaying layer of pre-mask material has been removed.
Figure 6:
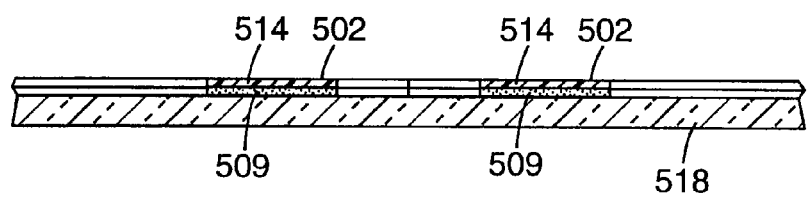
FIG. 6 is an enlarged fragmentary sectional view taken approximately along line 6—6 of FIG. 5.

That laminate 500 can then be provided to a person such a homeowner who can decorate a substrate 518, such as a surface of a glass sheet in a window surrounded by a frame 520 (see FIGS. 3, 4, 5, and 6), by removing the release liner 508 from the layers of adhesive 509 included in the display lengths 502 of decorative film tape in the laminate 500 and from the portions of the layer of removable adhesive 512 included in the layer of pre-mask material 510 that are exposed around the display lengths 502 of decorative film tape; placing the then exposed layers of adhesive 509 and 512 included in the display lengths 502 of decorative film tape and in the layer of pre-mask material 510 at a desired location on the substrate 518 (FIG. 3); pressing out air from between the substrate 518 and the layers of adhesive 509 included in the display lengths 502 of decorative film tape that have their outer major surfaces adhered to the layer of adhesive 512 included in the layer of pre-mask material 510; and then removing the layer of pre-mask material 510 to leave the display lengths 502 of decorative film tape adhered to the substrate 518 in the predetermined decorative pattern as illustrated in FIGS. 5 and 6.

When, as is preferred, the cover layer 511 and the layer of adhesive 512 on the cover layer 511 allow moisture vapor to pass between the surfaces of the layer of pre-mask material 510; the method can further include the step of using a lubricating liquid to wet the layers of adhesive 509 and 512 included in the display lengths 502 of decorative film tape and in the layer of pre-mask material 510, and to wet the substrate 518 before the step of placing the exposed layers of adhesive 509 and 512 included in the display lengths 502 of decorative film tape and in the layer of pre-mask material 510 on the substrate 518. This allows sliding the exposed layers of adhesive 509 and 512 included in the display lengths 502 of decorative film tape and in the layer of pre-mask material 510 along the substrate 518 for a short time after they are positioned there (i.e., 1 to 5 minutes) to precisely position the display lengths 502 of decorative film tape at a desired position along the substrate 518.

The lubricating liquid should then be allowed to substantially dry before the removing step although it is not necessary for the lubricating liquid to completely evaporate. The pressing step should include also pressing out lubricating liquid from between the layers of adhesive 509 included in the display lengths 502 of decorative film tape and the substrate on which they are positioned, during which pressing the layer of pre-mask material 510 protects the outer major surfaces of the display lengths 502 of decorative film from damage. More specifically, the substrate or glass sheet 518 to which the display lengths 502 of decorative film tape are to be attached should be cleaned (e.g., with a liquid glass cleaner), and the wetting a lubricating liquid or solution (e.g., ½% (by weight) dishwashing detergent in water) from a squirt bottle should then be used to wet the layers of adhesive 508 and 512 included in the pieces of decorative film tape and in the layer of pre-mask material 510 and to wet the substrate 518.

Figure 7:
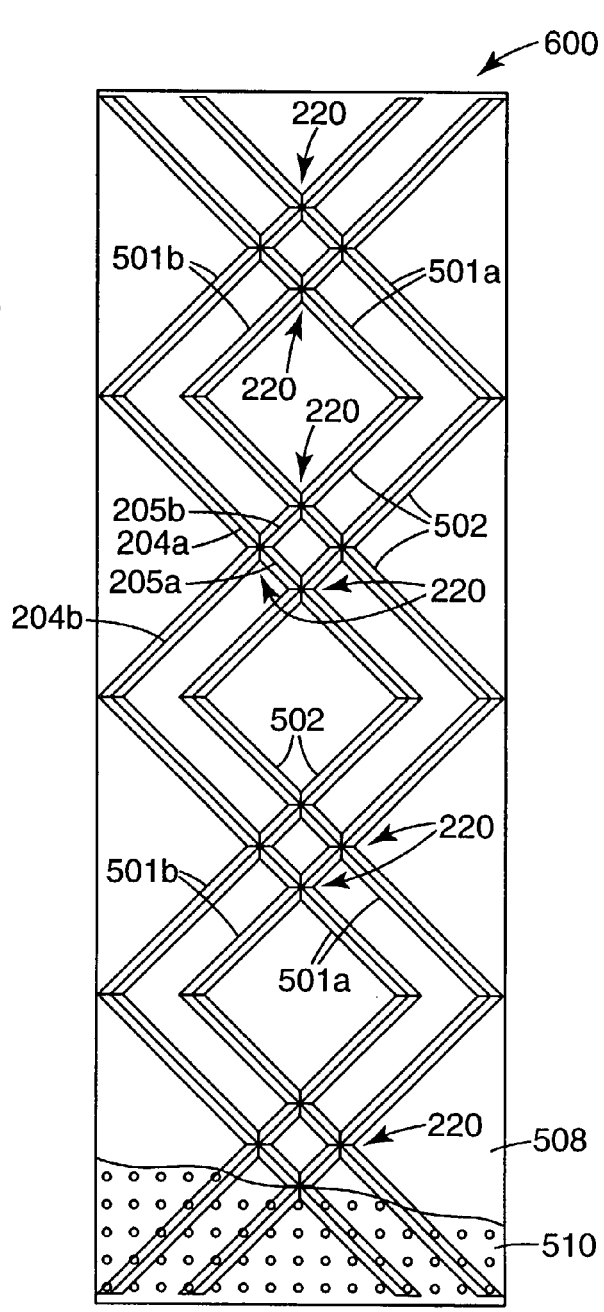
FIG. 7 illustrates a second embodiment of a laminate made by a method according to the present invention, which laminate is also adapted for use to decorate a substrate such as a pane or panes of glass and also includes a plurality of display lengths of decorative film tape adhered to a release liner in a predetermined decorative pattern, and a layer of pre-mask material (only a fragment of which is shown) that is adhered over the display lengths of decorative film and to the release liner in areas not covered by the display lengths of decorative film tape.

FIG. 7 illustrates an alternate embodiment of a laminate 600 made by a method according to the present invention, which laminate 600 is adapted for use to decorate a substrate such as a pane or panes of glass in a window, a door, or a mirror. The laminate 600 includes a plurality of display lengths 502 of the decorative film tape described above each adhered to a major surface of a sheet of the release liner 508 described above in a predetermined decorative pattern by layers 509 of pressure sensitive adhesive included in the display lengths 502 of decorative film tape; and a layer of the pre-mask material described above that is adhered to outer major surfaces of the display lengths 502 of decorative film 514 opposite the release liner 508, and to the major surface of the release liner 508 in areas not covered by the display lengths 502 of decorative film tape. Only a fragment of the layer of pre-mask material 510 is illustrated in FIG. 7, however that layer of pre-mask material 510 is coextensive with the release liner 508 and extends over all of the display lengths 502 of decorative film tape. The display lengths 502 of decorative film tape in the laminate 600 can be transferred to a substrate using the method described above with reference to the laminate 500.

The tape applicator 10 for Conning and applying display lengths 502 of decorative film tape to the release liner 508 in predetermined patterns including the patterns illustrated in FIGS. 1 through 7 can be the tape applicator 10 described in U.S. Pat. No. 6,571,849, the content of which application is hereby incorporated herein by reference. Generally, as is seen in FIGS. 8 through 18, the tape applicator 10 described in that application comprises a tabletop 21 having a planar support surface 22 adapted for supporting a sheet material such as the release liner 508 with its major surface opposite the support surface 22 in an application plane defined by the tape applicator 10; and a tape head 100 comprising a frame 106 having a leading end 107 and an opposite trailing end 115. The tape applicator 10 also includes a computer operated assembly adapted for moving the frame 106 of the tape head 100 over the support surface 22 in any predetermined pattern with that pattern including a plurality of straight line movements comprising straight line movements with the leading end 107 of the frame 106 leading. The tape bead 10 further includes an application member or roller 120 having a cylindrical application surface 121; means mounting the application member 120 on the frame 106 adjacent its trailing end 115 for movement between an application position with its application surface 121 along the application plane, and a release position with its application surface 121 spaced from or above the application plane. Means are provided on the frame 106 for supporting a supply length 92 of the decorative film tape and for guiding the supply length 92 of decorative film tape along a path extending over the application surface 121 with the edges of the decorative film tape along the path being parallel to the direction of movement of the frame 106 during the straight line movements with the leading end 107 of the frame 106 leading. Severing means or a first cutter 116 is provided on the frame 106 along the path for severing a discrete length 501 of the decorative film tape being applied to the release liner 508 along the application plane from the supply length 92 of decorative film tape moving along the path, as are means on the frame 106 for advancing the supply length 92 of decorative film tape along the path to move a newly severed end of the supply length 92 of decorative film tape formed by the first cutter 116 to the application surface 121. Cutting means or a second cutter 154 including a circular blade 156 having a sharp elongate circular cutting edge 155 about its periphery is mounted on the frame 106 for rotation and for movement between an application position with its cutting edge 155 along the application plane at which it can cut through a discrete length 501 of decorative film tape along the release liner 508, and a release position with its cutting edge 155 spaced from or above the application plane.

To form the laminate 500 the release liner 508 is supported on the support surface 22 to position its major surface opposite the support surface 22 in the application plane. Discrete lengths 501 of the decorative film tape are applied to the release liner 508 in a predetermined pattern typically (but not necessarily) with portions of certain of the discrete lengths 501 of decorative film tape overlapping each other by, for each discrete length 501, (1) positioning an end portion of the supply length 92 of decorative film tape along the application surface 121 of the application member 120 when the application member 120 is in its release position, (2) moving the application member 120 to its application position and moving the frame 106 of the tape head 100 over the application plane in straight line movement with the leading end 107 of the frame 106 leading to pull the supply length 92 of decorative film tape along the path and apply a straight discrete length 501 of the decorative film tape to the surface of the release liner 508 as the application member 120 moves over it, and (3) operating the severing means or first cutter 116 to form an end 96 for the applied discrete length 501 of decorative film tape and a new end for the supply length 92 of decorative film tape. The tape applicator 10 is then used to cut the discrete lengths 501 of decorative film tape applied on the release liner 508 with the second cutter 154 to form new ends on those applied discrete lengths 501 of decorative film tape at predetermined locations along the surface of the release liner 508, including aligned closely spaced ends at any overlapped portions of the applied discrete lengths 501 of decorative film tape, which cutting with the second cutter 154 forms the display lengths 502 of decorative film tape from the discrete lengths 501 of decorative film tape applied to the release liner 508. Such cutting is done by moving the frame 106 of the tape head 100 over the application plane along predetermined paths with the cutter 154 in its cutting position so that the cutting edge 155 of the cutter 154 traverses the applied discrete lengths 501 of decorative film tape. Scrap portions of the applied discrete lengths 501 of decorative film tape resulting from cutting those applied discrete lengths 501 of decorative film tape to form the new ends and thereby the display lengths 502 of decorative film tape are then manually removed from the release liner 508; and the layer of removable adhesive 512 included in the layer of pre-mask material 510 is manually adhered over the outer major surfaces 513 of the display lengths 502 of decorative film tape adhered to the release liner 508 and is also adhered to the release liner 508 around those display lengths 502 of decorative film tape, completing the laminate.

Following, with reference to FIGS. 8 through 18 is a more detailed description of the tape applicator 10 that was described in U.S. Pat. No. 6,571,849. The tape applicator 10 includes a frame 12 for holding the tabletop 21 that has the planar support surface 22. The tabletop 21 can be tilted as illustrated to allow an operator to easily place a sheet of material such as the release liner 508 on the support surface 22. The tape applicator 10 may include a vacuum system (not shown) for holding the sheet material or release liner 508 stationary on the support surface 22. Such a vacuum system could include small spaced openings through the tabletop 21 and support surface 22, which small spaced openings communicate with a source of air pressure well below atmospheric air pressure (i.e., a vacuum) beneath the tabletop 21. Alternatively, the release liner 508 could be held stationary on the support surface 22 through the use of static electricity, or the use of pressure sensitive adhesive coated tape (e.g., masking tape). The support surface 22 and frame 12 are sized to handle desired sizes of release liners such as the release liner 508 illustrated, and to support the tape head 100 and actuators 30, 32, and 34 that are included in means for moving the tape head over the support surface 22.

The tape applicator 10 defines an x-axis and a y-axis normal to the x axis, which x and y axes are in a plane parallel to the planar support surface 22 of the tabletop 21, together with a z-axis that is perpendicular to the plane defined by the x and y axes. The tabletop 21 includes a first raised edge 24 parallel to the x-axis and a second raised edge 26 parallel to the y-axis, and has a measuring scale 27 along each of those raised edges 24 and 26. A user can place a sheet of release liner 508 on the support surface 22 with its edges against the raised edges 24 and 26.

The tape applicator 10 includes a support arm 18 for supporting and moving the tape head 100 to different locations on the tabletop 21. The support arm 18 extends parallel to the y-axis and moves in a direction parallel to the x-axis along first slide rods 19a, 19b. The end of the support arm 18 opposite the first slide rods 19a, 19b includes a leg 54 and a wheel 56 rotatably mounted on the leg 54 that helps to support the support arm 18 above the tabletop 21 while allowing the support arm 18 to move along the support surface 22 in a direction parallel to the x-axis. The support arm 18 also includes second slide rods 60a, 60b, which are located on the side of the support arm 18 adjacent the tabletop 21 and extend in a direction parallel to the y-axis. The tape head 100 can move in a direction parallel to the y-axis along the slide rods 60a, 60b of the support arm 18.

Figure 8:
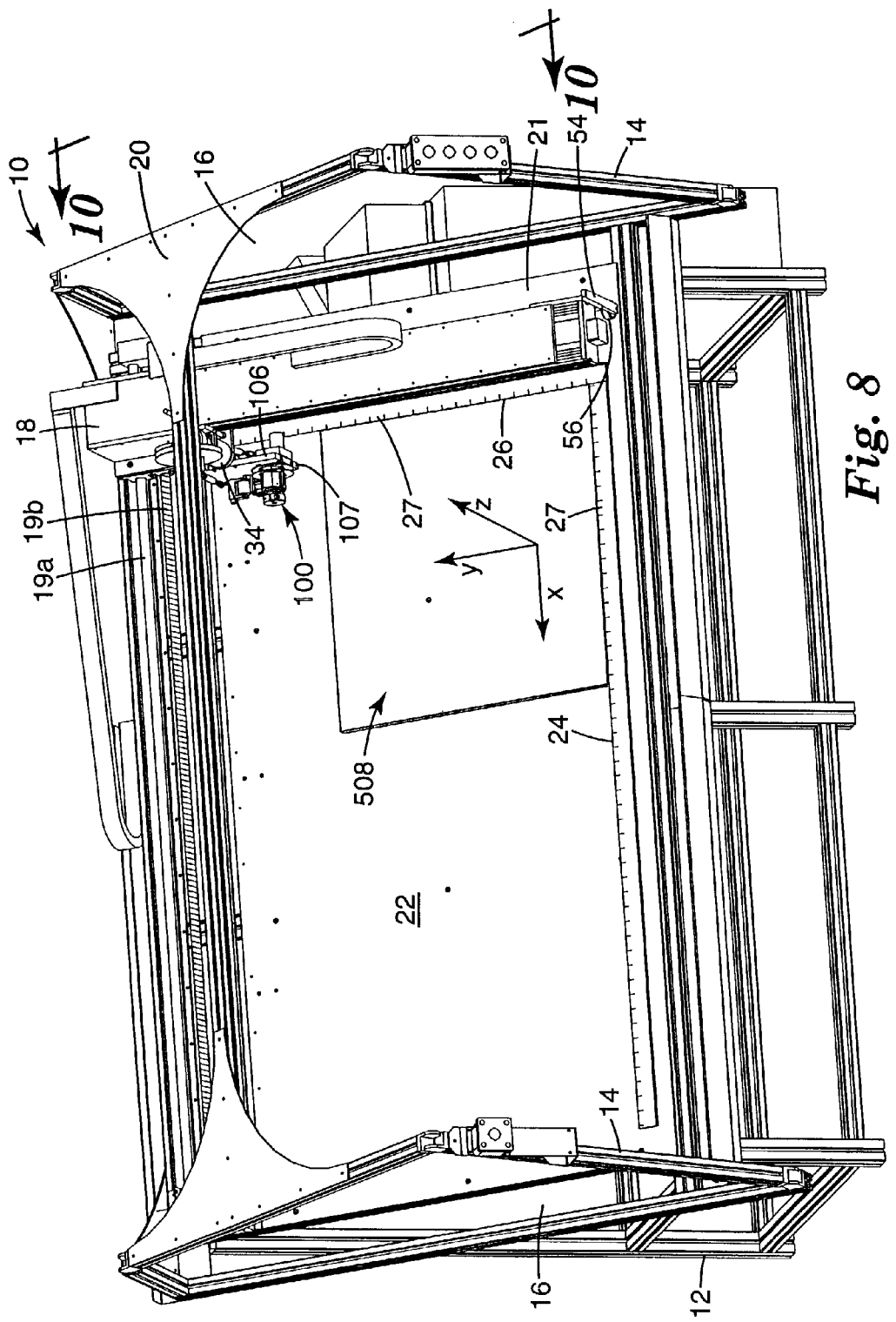
FIG. 8 is an isometric view of a tape applicator that can be used in the method according to the present invention, in which view a tape head included in the applicator is in a first position.
Figure 9:
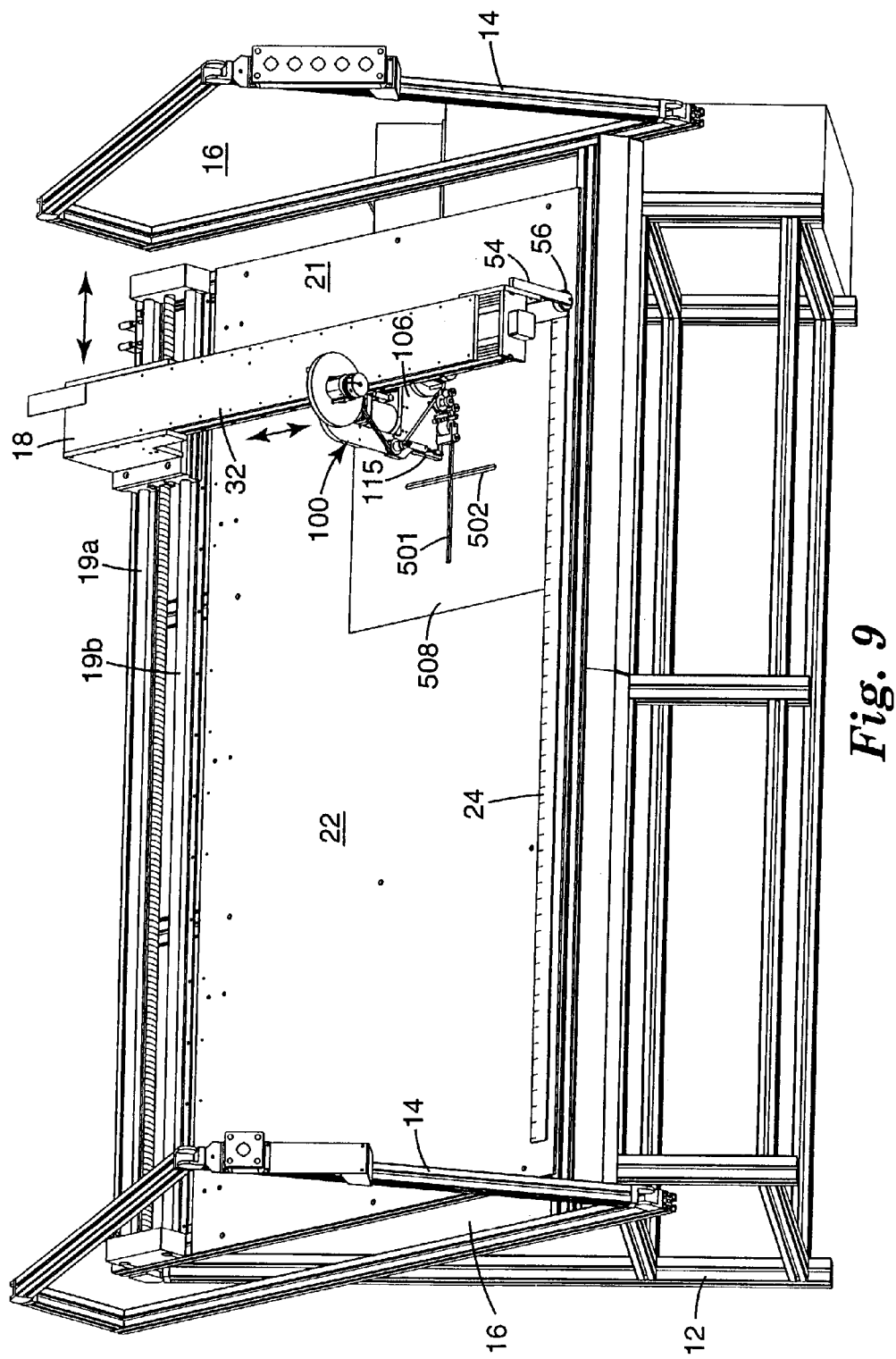
FIG. 9 is an isometric view of the tape applicator of FIG. 8 in which the tape head is in a second position while applying decorative film tape to a sheet of release liner in the method according to the present invention.

FIG. 8 illustrates the tape head 100 positioned in a "home position" above the tabletop 21. This is where the tape head 100 is normally located when an operator places a sheet of release liner 508 on the tabletop 21. FIG. 9 illustrates the tape head 100 moved to a different location, at which it is applying a discrete length 501 of decorative film tape to the sheet of release liner 508 as the tape head 100 moves over the support surface 22. To move the tape head 100 to a new location on the support surface 22, the tape head 100 may need to move in directions parallel to both the x-axis and the y-axis. To move the tape head 100 in a direction parallel to the x-axis of the tabletop 21, the support arm 18 slides along the first slide rods 19a and 19b. To move the tape head 100 in a direction parallel to the y-axis, the tape head moves along the second slide rods 60a, 60b that are located on the side of the support arm 18 adjacent the support surface 22. The tape applicator can move the tape head 100 to a first location along the support surface 22, adhere an end portion of the supply length 92 of decorative film tape to the sheet of release liner 508 on the support surface 22, and then apply a discrete length 501 of the decorative film tape to the sheet of release liner 508 on the support surface 22 by moving the tape head 100 in a straight line to a second location along the support surface 22.

Figure 10:
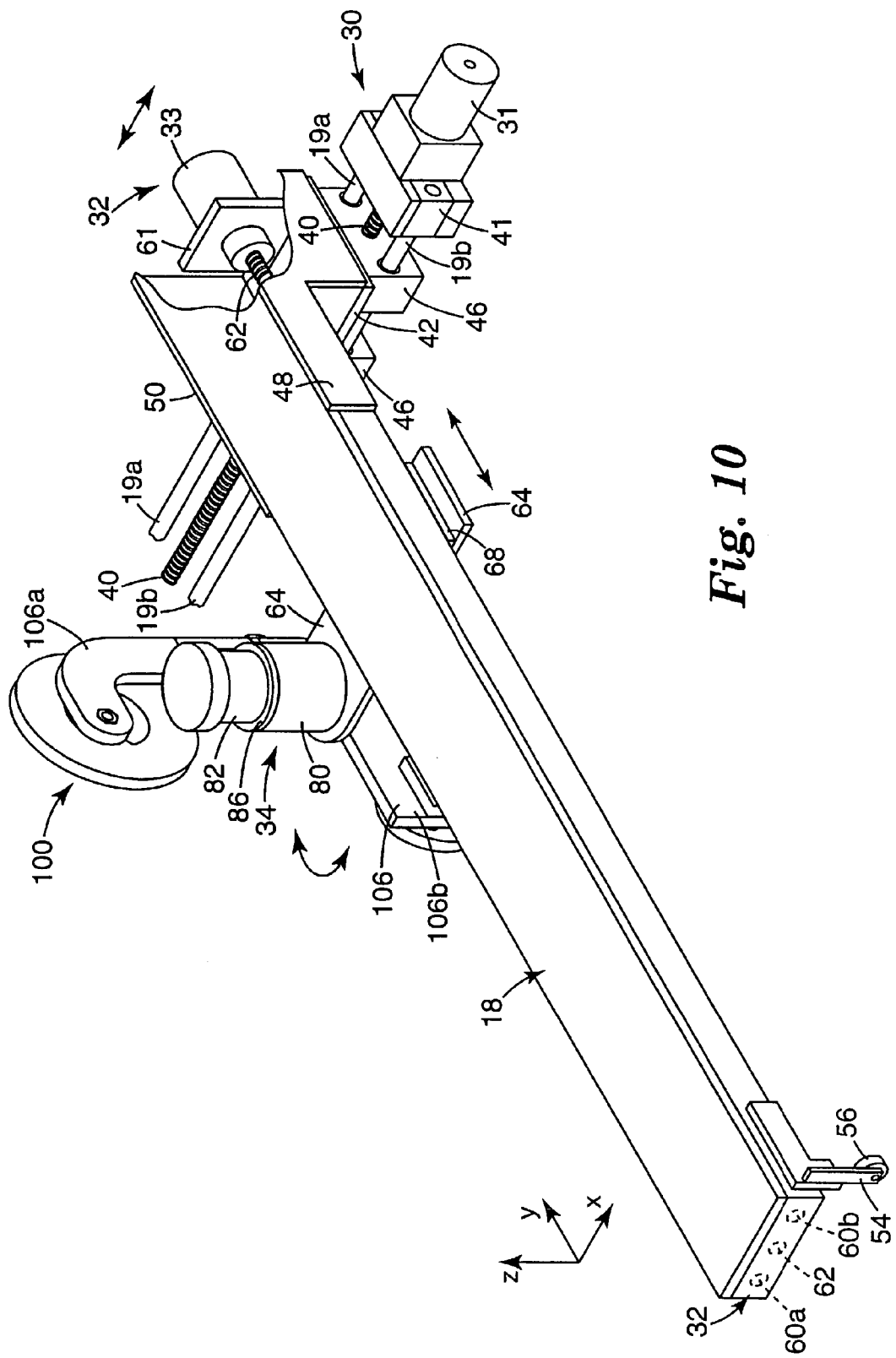
FIG. 10 is an enlarged isometric fragmentary view taken approximately along line 10—10 in FIG. 8 which shows an x-axis actuator, a y-axis actuator, a rotary actuator, the tape head and a support arm for the rotary actuator included in the tape applicator of FIG. 8.

FIG. 10 illustrates the x-axis actuator 30 by which the tape applicator 10 moves the tape head 100 in a direction parallel to the x-axis along the support surface 22, the y-axis actuator 32 by which the tape applicator 10 moves the tape head 100 in a direction parallel to the y-axis along the support surface 22, and the z-axis actuator 34 for rotating the tape head 100 around an axis parallel to the z-axis. The x-axis actuator 30 includes a motor 31, a ball screw 40, an end block 41 that contains a bearing for the ball screw 40 and receives the ends of the first slide rods 19a, 19b, and a car 46 for moving the support arm 18 along first slide rods 19a, 19b. The support arm 18 is attached to the car 46 by a plate 42. As the motor 31 turns the ball screw 40, the ball screw rotates moving the car 46 in a direction parallel to the x-axis along the first slide rods 19a, 19b. As the car 46 moves, the support arm 18 and tape head 100 move with the car 46 across the support surface 22. Any commercially available x-axis actuator capable of obtaining the conditions described herein may be used, such as the Linear System Actuator, sold under the trade name Thomson, part number 2EB16FTBTL, which is commercially available from Thomson Industries, Inc., Port Washington, N.Y. The motor 31 for the x-axis actuator is can be a step motor (e.g., the step motor sold under the trade name Compumotor, part number CP*S57-102-MO-25, which is commercially available from Braas Company, St. Paul, Minn.

The y-axis actuator includes the motor 33, a ball screw 62, an end block 61 that contains a bearing for the ball screw 62 and receives the ends of the first slide rods 60a, 60b, and a car 68 for moving the tape head 100 along support arm 18 in a direction parallel to the y-axis. The tape head 100 is attached to the car 68 by a plate 64. A portion of the support arm 18 is cut away to illustrate the y-axis actuator 32. As the motor 33 turns the ball screw 62, the car 68 moves along the second slide rods 60a and 60b in a direction parallel to the y-axis. As the car 68 moves, the tape head 100 moves with the car 68 along the support arm 18. Any commercially available y-axis actuators capable of obtaining the conditions described herein may be used, such as Linear System Actuator sold under the trade name Thomson, part number 2RBM160DMKL1300, which is commercially available from Thomson Industries, Inc., Port Washington, N.Y. The motor 61 for the y-axis actuator can be a step motor (e.g., the step motor sold under the trade name Compumotor, part number CP*S57-51-MO-25, which is commercially available from Braas Company, St. Paul, Minn.

The rotary actuator 34 for rotating the tape head 100 around an axis parallel to the z-axis is mounted on the plate 64. The rotary actuator 34 includes a motor 82, a gear reducer 80, and a flange 86 located between the motor 82 and gear reducer 80. The rotary actuator 34 is attached to the tape head 100 by a rotary shaft projecting from the actuator that has an end portion fixed in a bracket 105 (not seen in this view, see FIGS. 12 and 14) on the frame 106 of the tape head 100. The motor 82 is a step motor (e.g., the step motor sold under the trade name Compumotor, part number S83*135-MO-S , which is commercially available from Braas Company, St. Paul, Minn.). The gear reducer 80 is an in-line gear reducer (e.g., an in-line gear reducer with a twenty-five to one ratio so that every time the motor 82 turns twelve and a half revolutions, the gear reducer 80 will turn the tape head 100 180° around an axis parallel to the z-axis, such as the 25 to 1 gear reducer sold under the trade name Alpha, part number LP070M02-25-1/ZETA57-21, which is commercially available from Braas Company, St. Paul, Minn.

Figure 11:
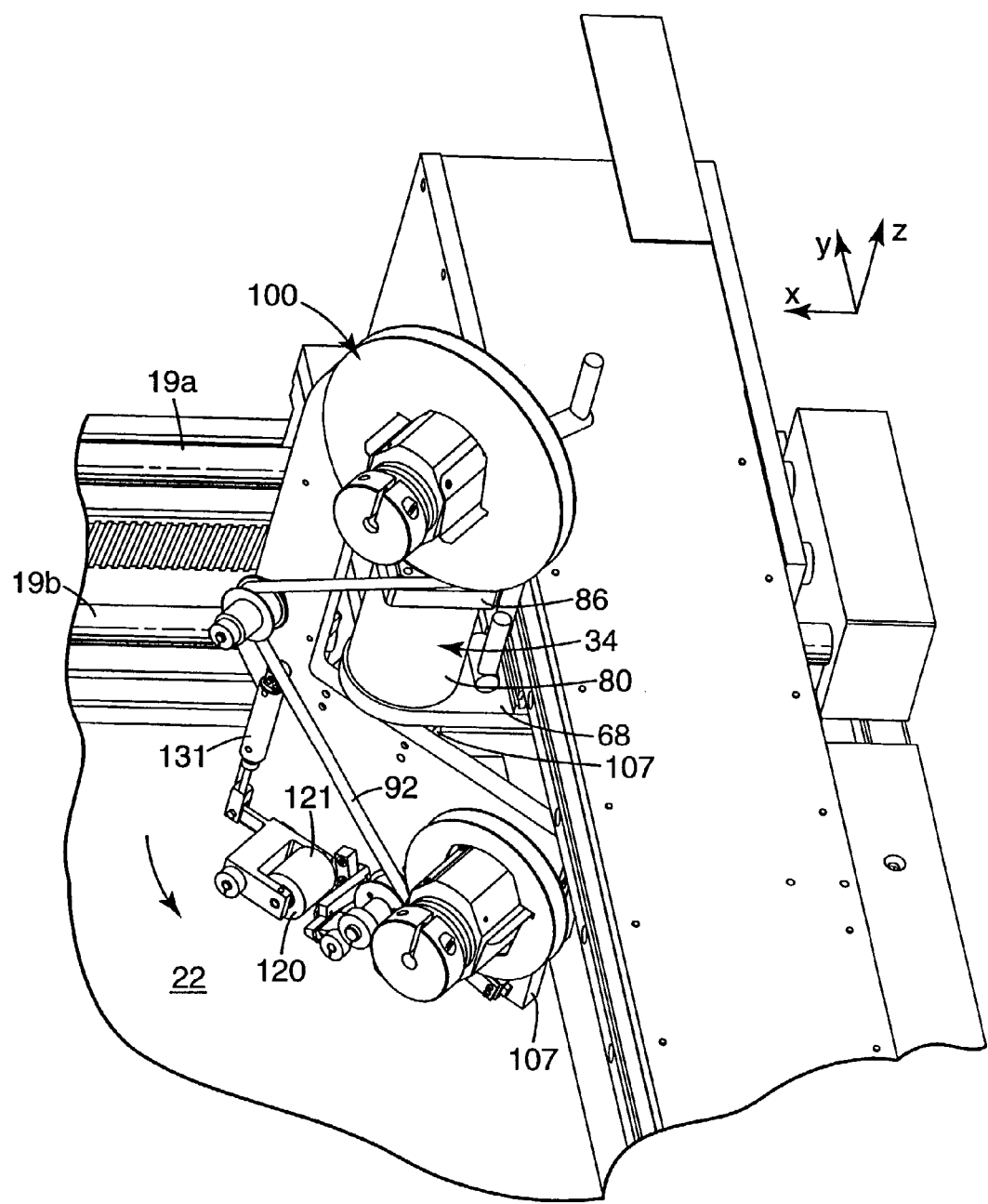
FIG. 11 is an enlarged fragmentary isometric view of the tape applicator of FIG. 8 showing the tape head rotated around a z-axis perpendicular to a planar support surface, the rotary actuator for rotating the tape head around that z-axis, and the support arm.

FIG. 11 illustrates the rotary actuator 34 rotating the tape head 100 around an axis parallel to the z-axis. The rotary actuator 34 rotates the tape head 100 around the axis parallel to the z-axis to position the tape head 100 at different angles on the support surface or tabletop 21. The tape head 100 can be rotated to a desired angle by the rotary actuator 34 to allow the second cutter 154 to cut a discrete length 501 of decorative film tape after it has been applied to the sheet of release liner 508, which is explained in greater detail below. The rotary actuator 34 is mounted on the car 68 of the support arm 18. The rotary actuator 34 includes the motor 82 and the gear reducer 80 for rotating the tape head 100 around an axis parallel to the z-axis. As noted above, the gear reducer 80 has a shaft extending from it (not seen in this view), which attaches to and is fixed in the bracket 105 (see FIGS. 12 and 14) mounted on a second side 113 of the frame 106 for the tape head 100. As the rotary actuator 34 turns the shaft, the tape head 100 turns with the shaft around an axis parallel to the z axis.

Figure 12:
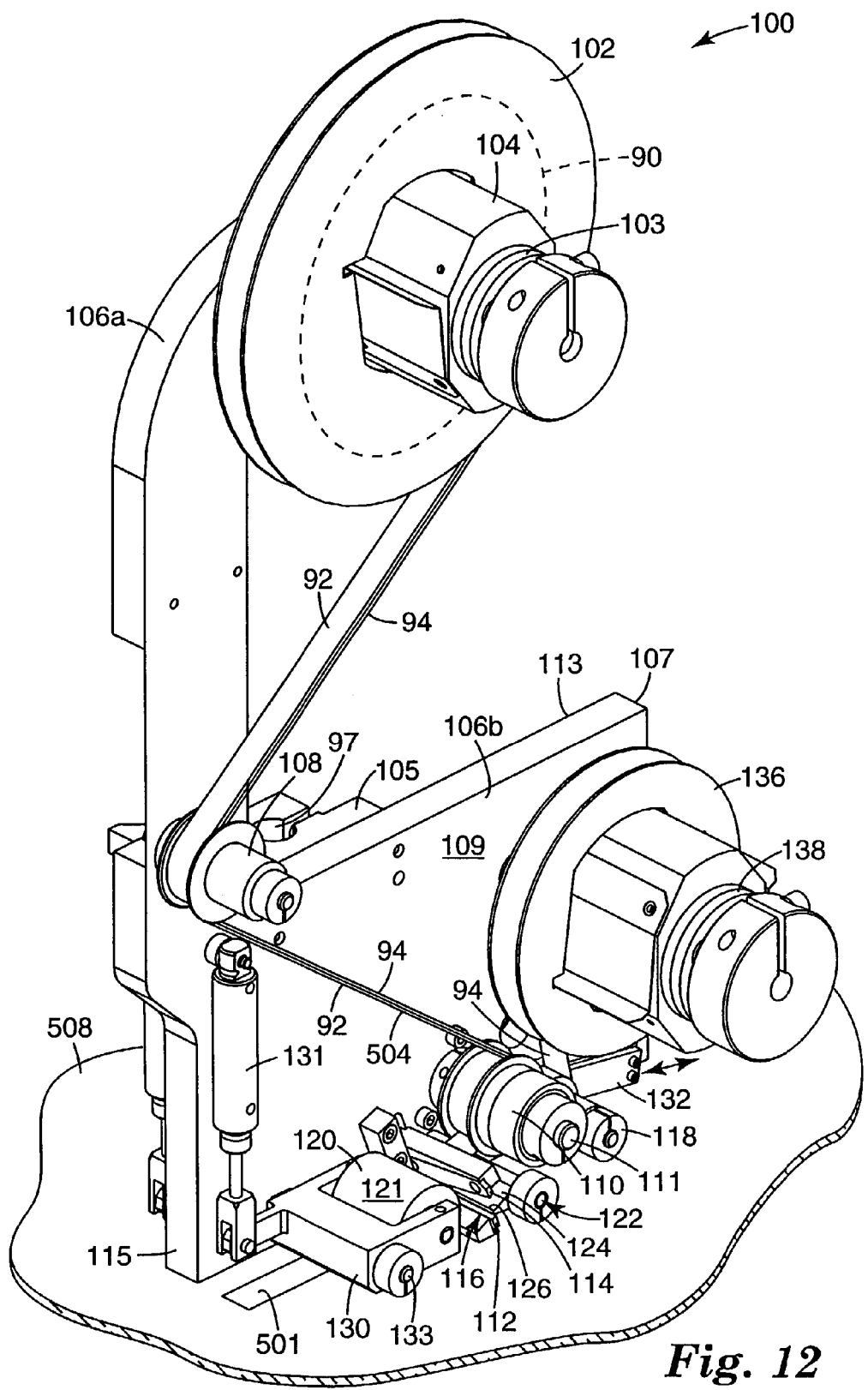
FIG. 12 is an enlarged fragmentary isometric view of a first side of the tape head of FIG. 8.
Figure 13:
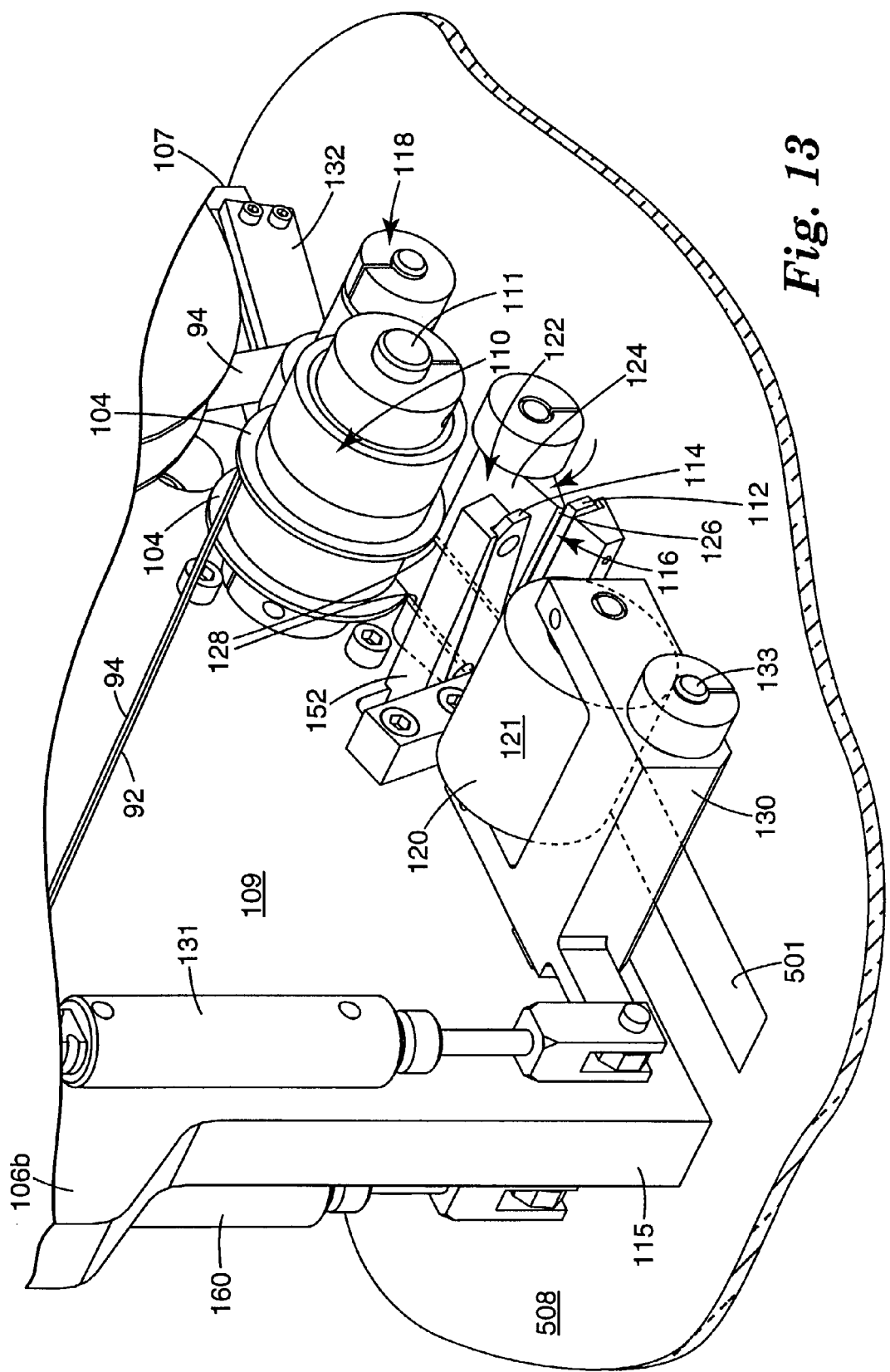
FIG. 13 is an enlarged fragmentary isometric view of the first side of the tape head of FIG. 8.
Figure 14:
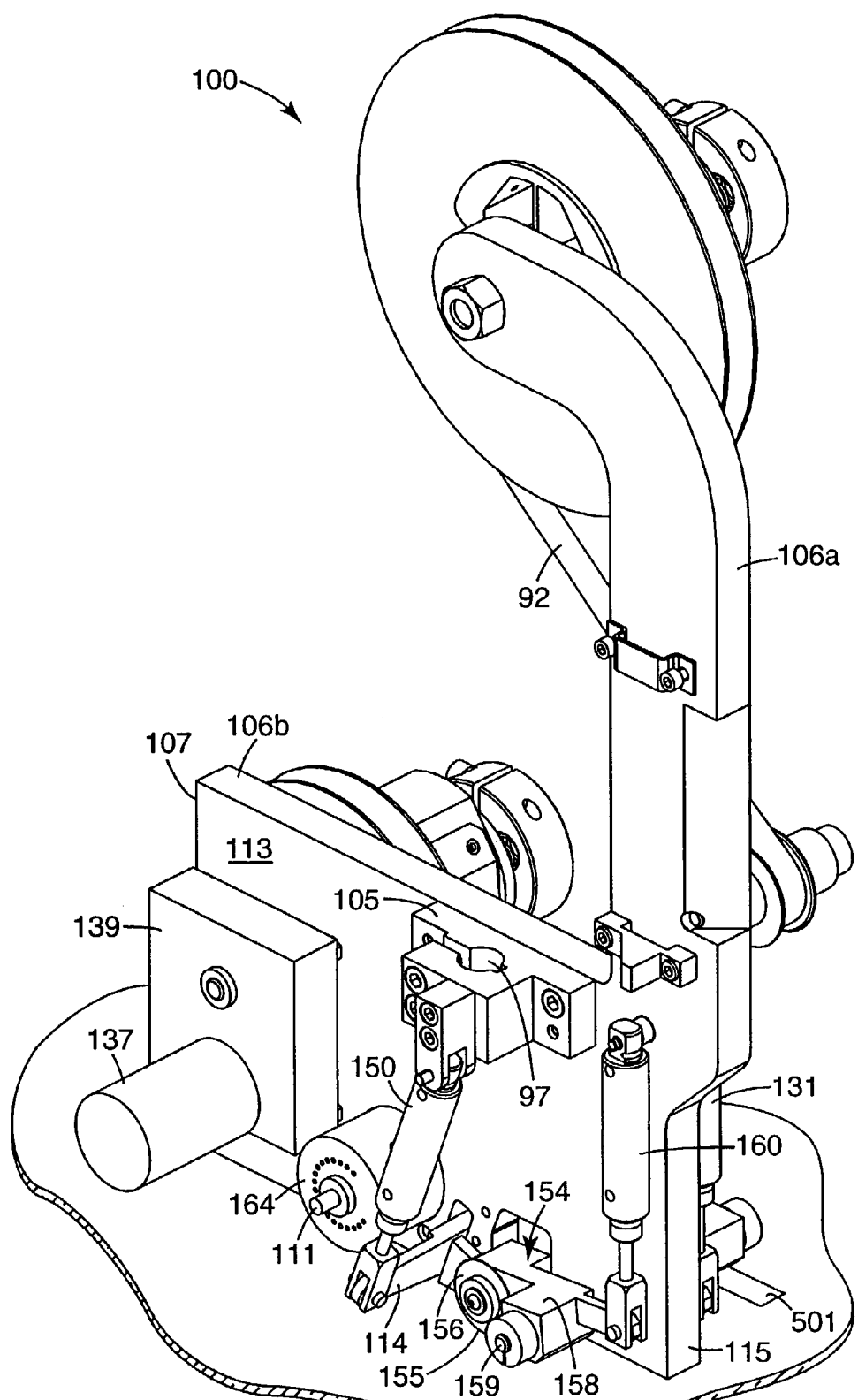
FIG. 14 is an enlarged fragmentary isometric view of a second side of the tape head of FIG. 8 opposite its first side.

Details and operation of the tape head 100 are illustrated in FIGS. 12 through 14. The tape head 100 first begins applying a discrete length 501 of the supply length 92 of decorative film tape to the sheet of release liner 508 and then, as that discrete length 501 of decorative film tape is being applied, the tape head 100 cuts the decorative film tape with the first cutter 116 to form the end of the discrete length 501 of the decorative film tape being applied to the release liner 508. An end portion of that discrete length 501 of decorative film tape being applied to the release liner 508 is then applied to the sheet of release liner 508 by the tape head 100 as the tape head 100 continues moving over the sheet of release liner 508. Next, the tape head 100 cuts the discrete length 501 of decorative film tape adhered to the sheet of release liner 508 with the second cutter 154 to form new ends of desired shapes and at desired locations on the release liner 508 along the applied discrete length 501 of decorative film tape(e.g., the new ends can extend in a direction at a right angle to or oblique to the longitudinal edges of the applied discrete length 501 of decorative film tape), forming one or more display lengths 502 of decorative film tape from that discrete length 501 of decorative film tape, and leaving scrap pieces of that applied discrete length 501 of decorative film tape at the newly formed ends of the display lengths 502 of decorative film tape. Those scrap pieces of the applied discrete length 501 of decorative film tape are then removed from the sheet of release liner 508, which removal can be done manually by an operator of the tape applicator 10.

FIG. 12 illustrates a first side 109 of the tape head 100. The rotary actuator 34 for rotating the tape head 100 around an axis parallel to the z-axis is not shown. The tape head 100 includes the frame 106 that has an upper portion 106a and a lower portion 106b. A tape roll holder 102 and a second tape guide roller 108 are rotatably mounted on the upper portion 106a. The tape roll holder 102 will receive a roll 90 of the supply length 92 of decorative film tape that has a release liner 94 releasably adhered along its coating 509 of pressure sensitive adhesive. The tape roll holder 102 includes a friction clutch 103 to provide back tension on the supply length 92 of decorative film tape as it unwinds from the tape roll 90. The tape head 100 also includes a first tape guide roller 110, a pinch roller 118, a pivotable tape guide 122, the first cutter 116, the application roller 120, and a liner take-up roller 136, all mounted on the lower portion 106b of the frame 106. The first cutter 116 includes a fixed lower blade 112 and a moveable upper blade 114 that may be pivoted relative to the fixed blade 112 to sever the decorative film tape. The application roller 120 is rotatably mounted on a bracket 130, which bracket 130 is mounted on the lower portion 106b of the frame 106 for pivotal movement about a shaft 133 so that it can be moved by operation of an air cylinder 131 connected between the bracket 130 and the frame 106 to move the peripheral or application surface 121 of the application roller 120 adjacent the support surface 22 between an application position with its application surface 121 along and biased against a surface such as that of the release liner 508 along the application plane, and a release position with its application surface 121 spaced above the application plane. The liner take-up roller 136 includes a friction clutch 138 driven by a motor 137 through gears in a speed reducer 139 to provide tension in the release liner 94 as it is wound onto the liner take-up roller 136.

The supply length 92 of decorative film tape moves along a path from the tape roll holder 102 to the second tape guide roller 108; then to the nip formed between the first tape guide roller 110 and the pinch roller 118; then to the pivotal tape guide 122; then between the blades 112 and 114 of the first cutter 116 which are normally spread apart; and then under the peripheral surface 121 of the application roller 120 which peripheral surface provides the application surface 121 for applying the decorative film tape to the release liner 508. The release liner 94 moves along the portion of that path extending from the tape roll holder 102 to the pivotal tape guide 122 which separates the release liner 94 from the supply length 92 of decorative film tape. After the release liner 94 is separated from the supply length 92 of decorative film tape, the release liner 94 winds around the pinch roller 118 and is taken up by the liner roller 136, as is seen in more detail in FIG. 15.

After loading a new roll 90 of decorative film tape having the release liner 94 adhered thereto onto the tape head 100, the decorative film tape and release liner 94 are threaded through the tape head 100 along the tape path outlined above. The pinch roller 118 is mounted on the end of a mounting slide 132. The mounting slide 132 may be slid away from the first tape guide roller 110 to allow the supply length 92 of the decorative film tape and the liner 94 to be positioned in the nip between the pinch roller 118 and the first tape guide roller 110. The liner 94 is separated from the supply length 92 of decorative film tape near the pivotal decorative film tape guide 122. The liner 94 is then wound around the pinch roller 118 and wound around the liner roller 136.

FIG. 13 is a partial isometric view of the lower portion 106b of the frame 106. The decorative film tape winds around the first tape guide roller 110 between two opposite tape edge guides 104. The tape edge guides 104 assist in keeping the supply length 92 of decorative film tape straight just prior to its application to the release liner 508 by the application roller 120. The supply length 92 of decorative film tape then passes over the pivotal tape guide 122 along a guide surface 124 including two opposite tape edge guides 128 aligned with the tape edge guides 104 on the first tape guide roller 110. The tape edge guides 128 also assist in keeping the supply length 92 of decorative film tape straight just prior to its application to the release liner 508 by the application roller 120. The release liner 94 is separated from the decorative film tape at a sharp edge 126 of the guide surface 124 between the two tape edge guides 128. The guide surface 124 of the pivotal tape guide 122 can be pivoted to the position best seen in FIG. 13 at which the guide surface 124 directs the decorative film tape over the fixed blade 112 of the first cutter 116. The moveable blade 114 is pivoted away from the fixed blade 112 to allow the decorative film tape to pass between the blades 112, 114 of the first cutter 116. The discrete length 501 of decorative film tape is then applied to the surface of the release liner 508 by the application roller 120.

FIG. 14 illustrates the second side 113 of the tape head 100, which is opposite the first side 109 of the tape head 100 illustrated in FIG. 12. The rotary actuator 34 for rotating the tape head 100 around the z-axis is not shown. The bracket 105 fixed to the frame 106 is clamped around a rotatable driven shaft (not shown) from the rotary actuator 34 received in a socket 101 in the bracket 105 to attach the tape head 100 to the rotary actuator 34. The tape head 100 includes a rotary motor 164 mounted to the lower portion 106b of the frame 106 for driving the first tape guide roller 110 by shaft 111 through a one-way clutch bearing (not shown). The one-way clutch bearing allows the first tape guide roller 110 to rotate freely during application of a discrete length 501 of the decorative film tape by movement of the tape head 100, and also allows the first tape guide roller 110 to be driven by the rotary motor 164 to advance the new end of the supply length 92 of decorative film tape to the application roller 120 after the applied discrete length 501 of decorative film tape has been cut from the supply length 92 by the first tape cutter 116. The tape head 100 also includes a first air cylinder 150 attached between the frame 106 and the moveable blade 114 for actuating the moveable blade 114 in the first cutter 116. The tape head 100 also includes the second cutter 154 mounted on the lower portion 106b of the frame 106. The second cutter 154 includes the circular blade 156 having the elongate sharpened edge 155 extending about its periphery that is mounted for rotation about its axis on a bracket 158. The bracket 158 is pivotably mounted on the frame 106 by a pivot shaft 159 and is pivotable by a second air cylinder 160 between the frame 106 and the bracket 158 for movement between a release position with its cuffing edge 155 spaced from (i.e., above) the application plane at which release position the second cutter 154 is positioned when a discrete length 501 of decorative film tape is being applied to the release liner 508 by movement of the tape head 100; and an application position with its cutting edge 155 along the application plane at which the second cutter 154 can be positioned to cut new ends on discrete lengths 501 of decorative film tape already applied to the release liner 508 by movement of the frame 106 over the application plane along a predetermined path so that the cutting edge 155 traverses the applied discrete length 501 of decorative film tape. The rotary actuator 34 (not shown) rotates the tape head 100 about the z-axis to correctly position the blade 156 at a desired angle relative to the applied discrete length 501 of decorative film tape on the release liner 508 to allow the blade 156 to cut the applied discrete length 501 of decorative film tape. Alternatively, the second cutter 154 could rotate independently of the tape head 100 and thus, not require the entire tape head 100 to rotate.

FIGS. 15 to 18 illustrate portions of the method according to the present invention for applying display lengths 502 of the decorative film tape to the release liner 508 in a predetermined pattern (e.g., the patterns shown in FIGS. 1 and 7) which method includes applying discrete lengths 501 of the decorative film tape to the release liner 508 in a predetermined pattern, and then cutting those discrete lengths 501 of the decorative film tape after they have been applied to the release liner 508 to form ends of predetermined shapes and at a predetermined positions on the release liner 508 along those applied discrete lengths 501 of decorative film tape, (some of which new ends can be in positions aligned with and closely spaced from each other) to form one or more display lengths 502 of the decorative film tape from the discrete lengths 501 of decorative film tape.

Figure 15:
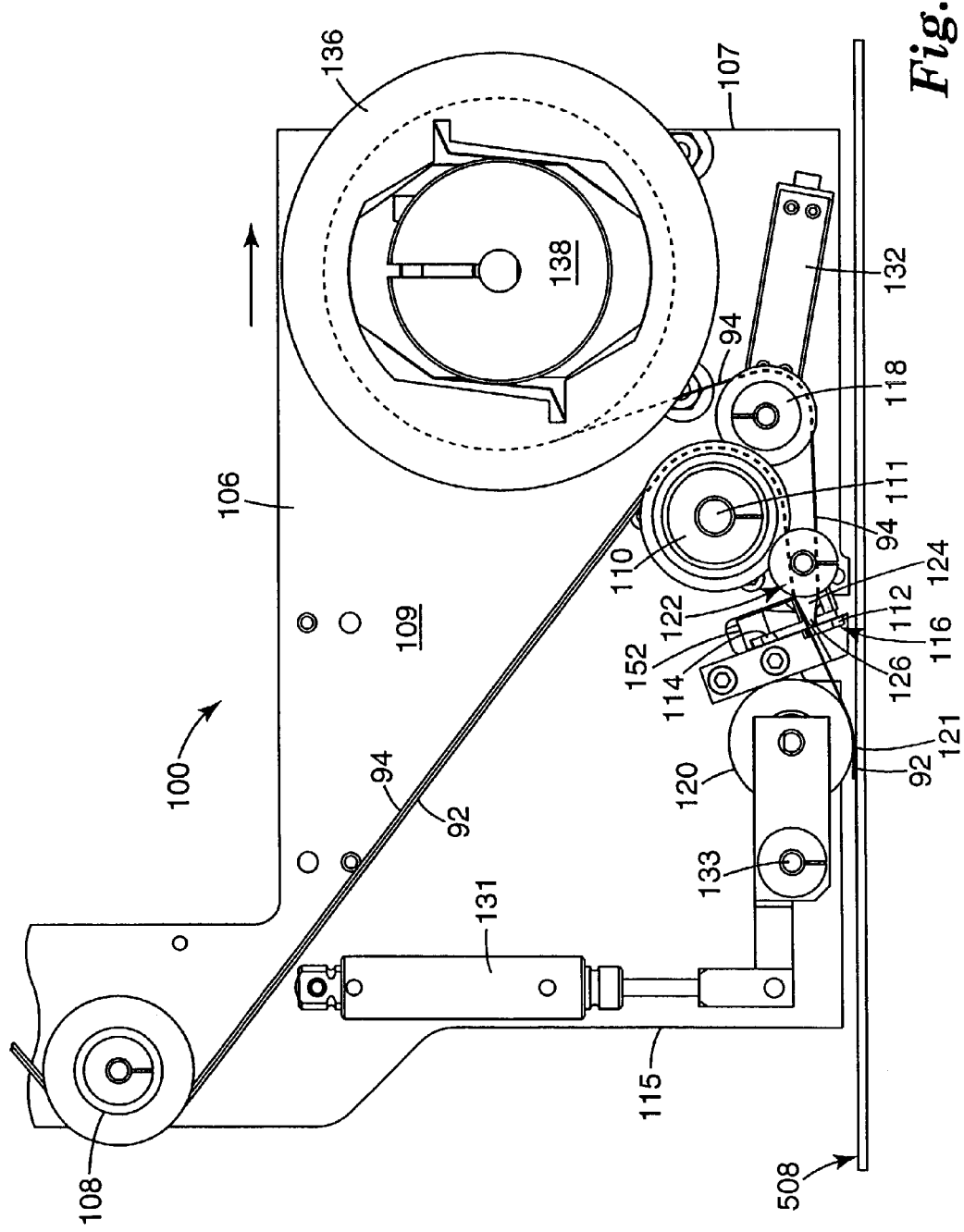
FIG. 15 is an enlarged fragmentary view of the first side of the tape head of FIG. 8 as the tape head starts to apply the decorative film tape to the sheet of release liner.

FIG. 15 illustrates the tape head 100 as it begins to apply a discrete length 501 of the decorative film tape to the surface of the release liner 508. An end portion of the decorative film tape has been advanced from the first cutter 116 to a position between the release liner 508 and the peripheral application surface 121 on the application roller 120 when that application surface 121 is in its release position by operation of the motor 164 to rotate the first tape guide roller 110 through the one way clutch. The application roller air cylinder 131 is then actuated to move the application roller 120 to its application position with its application surface 121 biased against the decorative film tape on the release liner 508 so that the adhesive layer 509 bonds the decorative film tape to the release liner 508. The tape head 100 is then moved over the stationary release liner 508 so that the decorative film tape is pulled by such movement along the tape path through the tape head 100 and is applied to the release liner 508 by movement of the application surface 121 along the discrete length 501 of decorative film tape being applied. The tape roll holder 102 and the first and second tape guide rollers 110 and 108 then freely rotate (i.e., the first tape guide roller 110 rotates without rotating the motor 164 because of the one way clutch between the motor 164 and the first tape guide roller 110).

Figure 16:
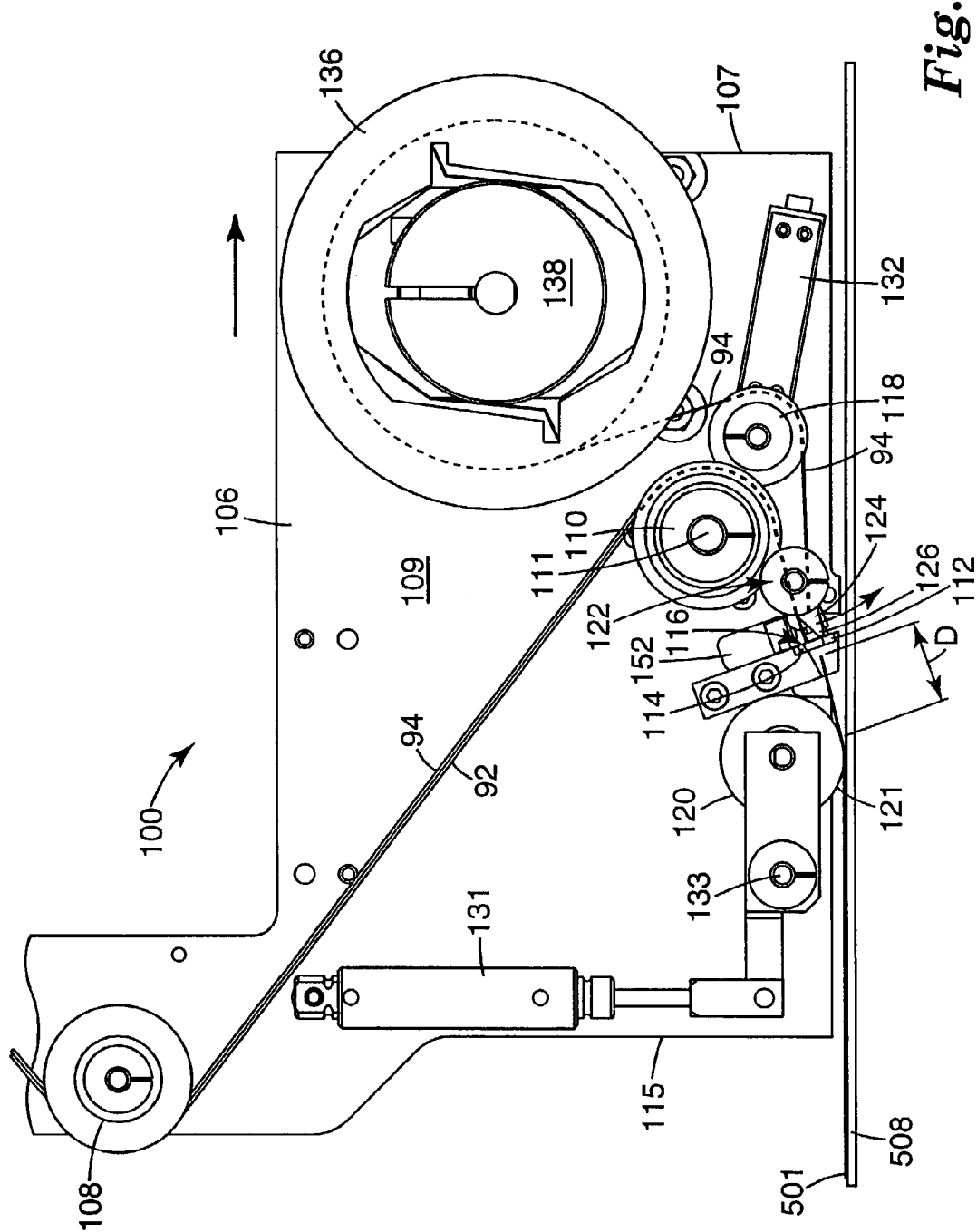
FIG. 16 is an enlarged fragmentary view of the first side of the tape head of FIG. 8 as a first cutter cuts a discrete length of the decorative film tape being applied to the sheet of release liner from a supply length of the decorative film tape carried on the tape head.

FIG. 16 illustrates the tape head 100 after a discrete length 501 of the decorative film tape has been applied to the release liner 508 and just after the first cutter 116 has cut that discrete length 501 of decorative film tape from the supply length 92 of decorative film tape. The first air cylinder 150 has moved the moveable blade 114 to contact the fixed blade 112 and thereby transversely cut the decorative film tape. As the moveable blade 114 is moved to contact the fixed blade 112, the tape guide 122 is rotated counter clockwise to move the guide surface 124 away from the blades 114 and 116 because of a ball joint between the moveable blade 114 and the pivotal tape guide 122 that causes them to move together. Cutting the applied discrete length 501 of decorative film tape from the supply length 92 of decorative film tape has formed a new end on the supply length 92 of decorative film tape and has also formed a second end 96 on the applied discrete length 501 of decorative film tape which still has a portion D adjacent that second end 96 yet to be applied to the release liner 508, which portion D is applied by further movement of the tape head 100 as is illustrated in FIG. 17.

Figure 17:
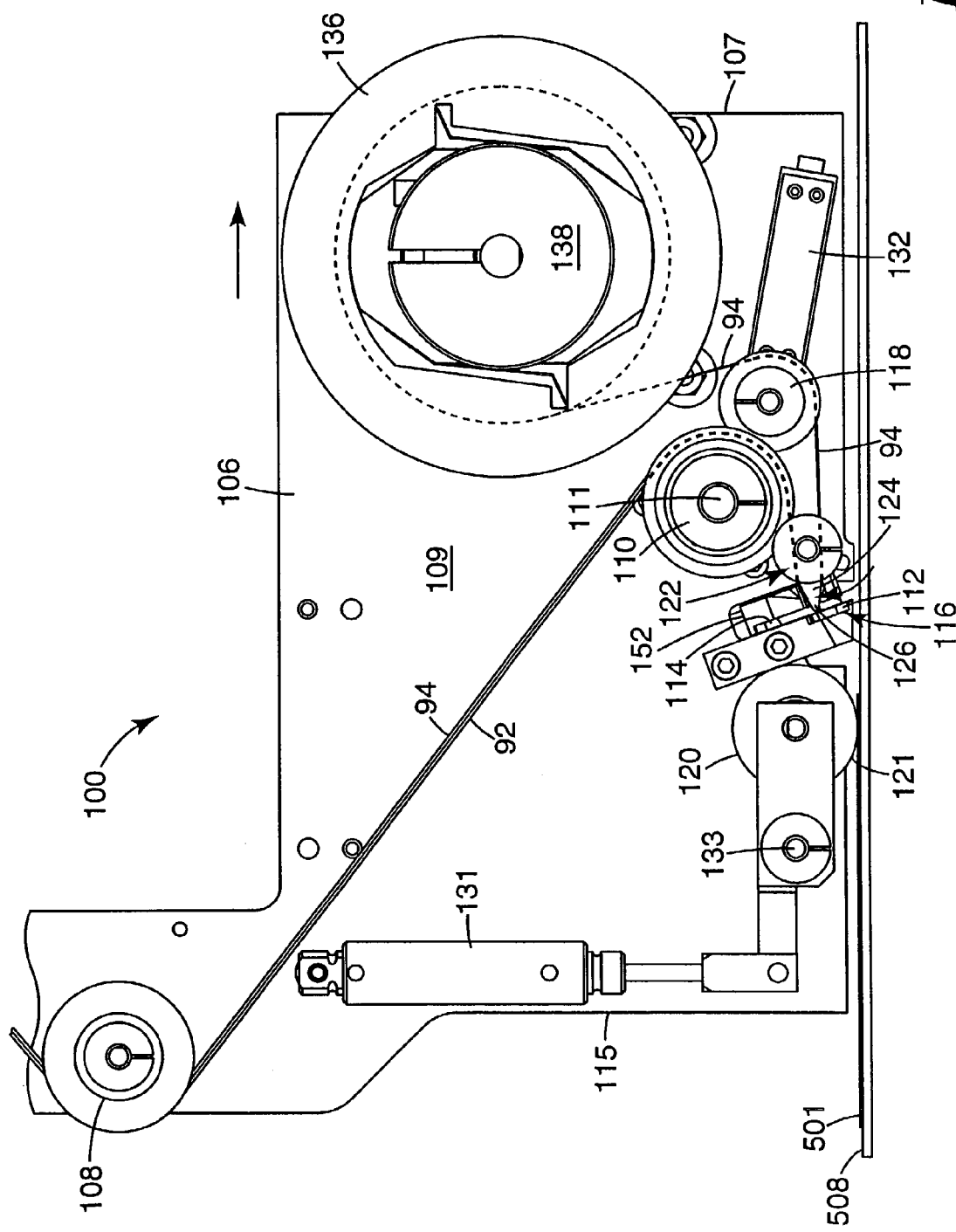
FIG. 17 is an enlarged fragmentary view of the first side of the tape head of FIG. 8 as it finishes applying the cut discrete length of decorative film tape to the sheet of release liner.

FIG. 17 also illustrates the first air cylinder 150 having moved the moveable blade 114 out of contact with the fixed blade 112 and thereby having moved the pivotal tape guide 122 clockwise to position the guide surface 124 between the blades 114, 112 because of the connection between the moveable blade 114 and the tape guide 122 to allow the decorative film tape to pass through the first cutter 116 when the newly cut end of the supply length 92 of decorative film tape is subsequently advanced to a position along the application surface 121 on the application roller 120 as was described above.

Figure 18:
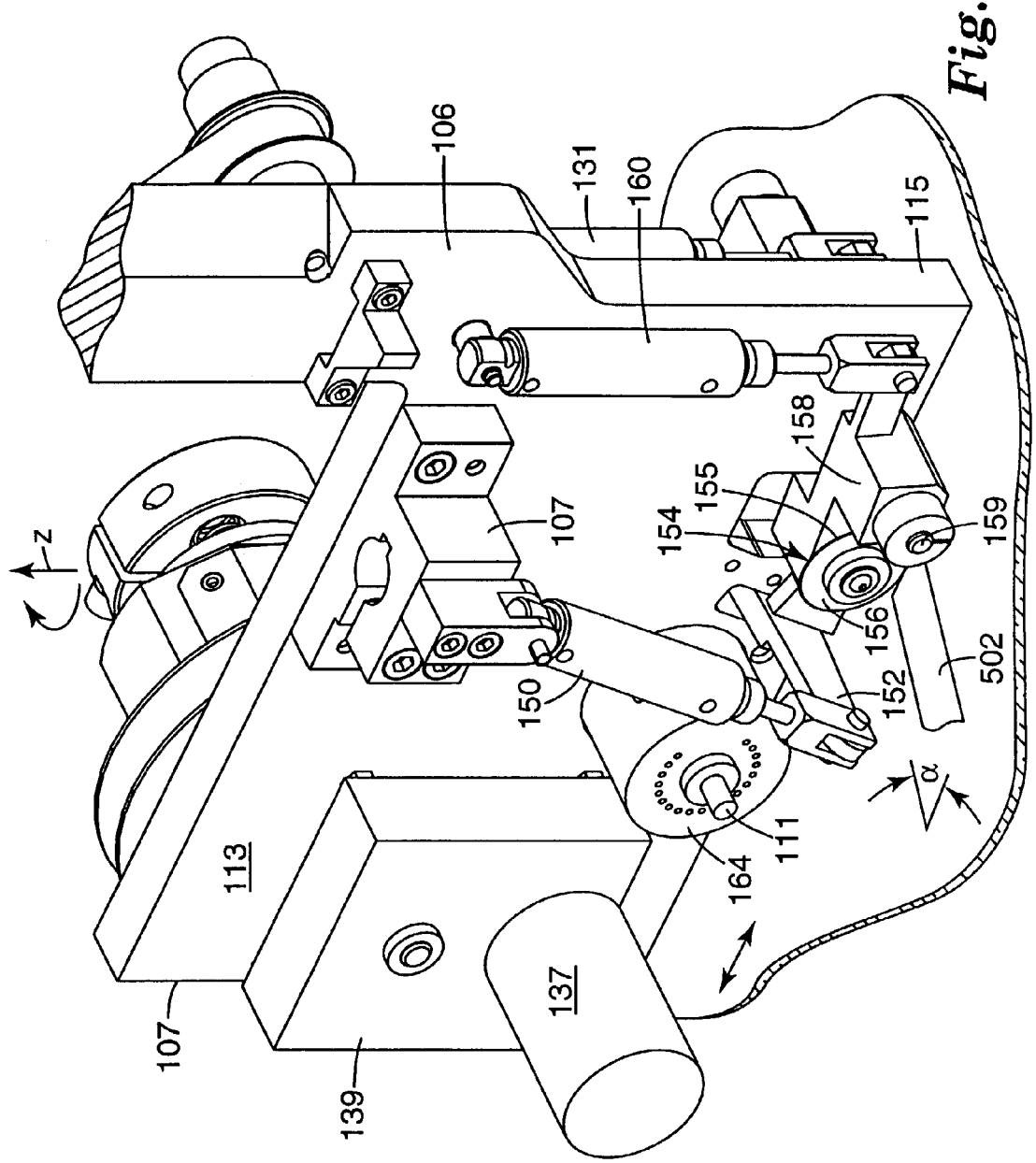
FIG. 18 is an enlarged fragmentary isometric view of the second side of the tape head of FIG. 8, illustrating a second cutter of the tape head as it cuts the discrete length of decorative tape that was previously applied to the sheet of release liner.

FIG. 18 illustrates the second cutter 154 cutting the discrete length 501 of optical film tape after it has been applied to the release liner 508 to form at least one display length 502 of optical film tape. The application roller air cylinder 131 has moved the application surface 121 on the application roller 120 to its release position spaced from the surface of the release liner 508. The x-axis and y-axis actuators 30 and 32 have moved the blade 156 to a predetermined position along the applied discrete length 501 of optical film tape, and the rotary actuator 134 (not shown) has rotated the tape head 100 about an axis parallel to the z-axis to a desired angle a relative to the applied discrete length 501 of optical film tape to accurately position the blade 156 of the second cutter 154 at a desired position and angle relative to the applied discrete length 501 of optical film tape on the release liner 508. The x-axis and y-axis actuators 30 and 32 then move the tape head 100 back and forth in the direction of the orientation of the blade 156 to cause the blade 156 to cut through the applied discrete length 501 of optical film tape at the angle a, which as illustrated is oblique to the length of the applied discrete length 501 of optical film tape.

Figure 20:
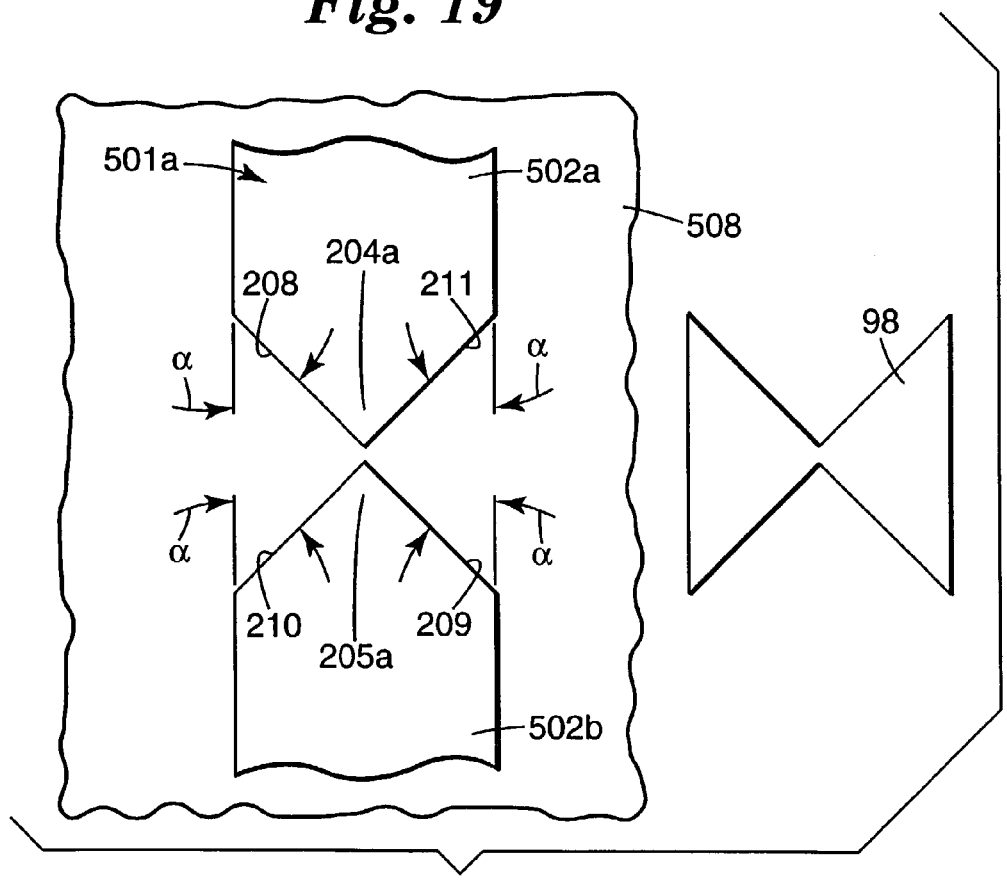
FIG. 20 is a top view of the first discrete length of decorative film tape applied to the release liner as illustrated in FIG. 19 with a scrap portion of that first discrete length of decorative film formed by the cuts illustrated in FIG. 19 removed from the release liner.
Figure 21:
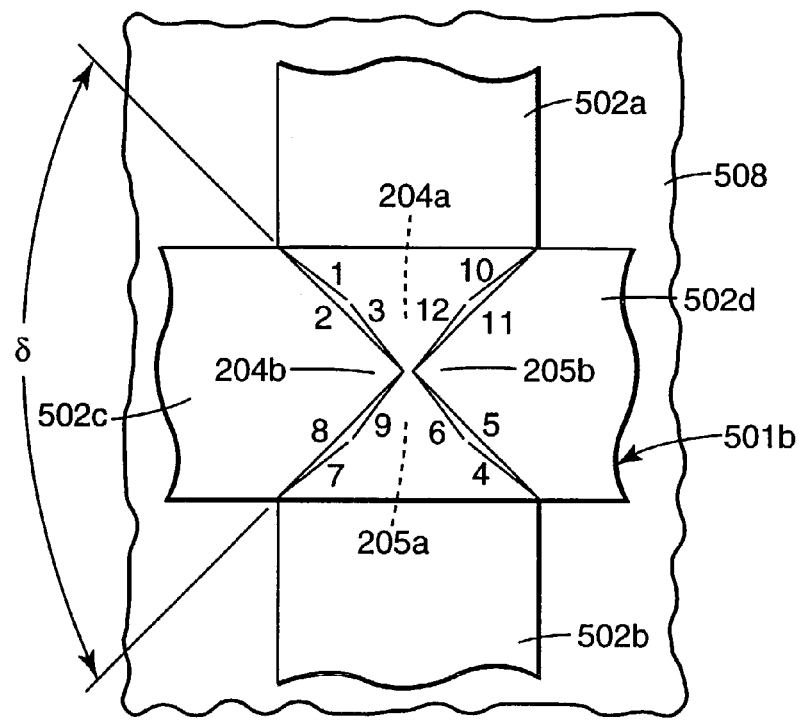
Figure 22:
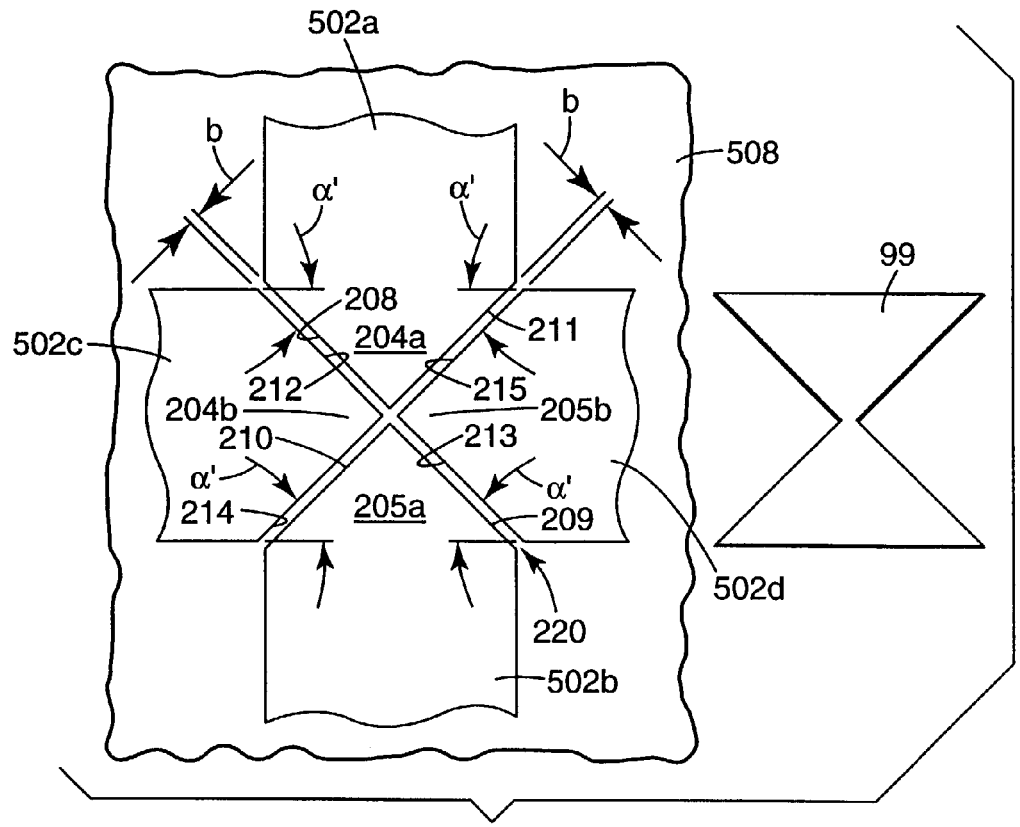
FIG. 22 is a top view of the second discrete length of decorative film tape applied to the release liner as illustrated in FIG. 21 with a scrap portion of the second discrete length of decorative film tape formed by the cuts illustrated in FIG. 21 removed from the release liner to provide aligned closely spaced ends on adjacent parts of first and second display lengths of decorative film tape.

FIGS. 19 through 22 sequentially illustrate, by showing discrete lengths 501a and 501b of the decorative film tape applied to the release liner 508 and sequences of cuts made by the second cutter 154 in those discrete lengths 501a and 501b of the decorative film tape, the operation of the tape applicator 10 to form an intersection 220 between display lengths 502a, 502b, 502c, and 502d of decorative film tape formed from the first and second discrete lengths 501a and 501b of the decorative film tape, which display lengths 502a, 502b, 502c, and 502d of decorative film tape have straight end surface portions 208, 209, 210, 211, 212, 213, 214, and 215 aligned with and closely spaced from each other as is illustrated in FIG. 22.

Figure 19:
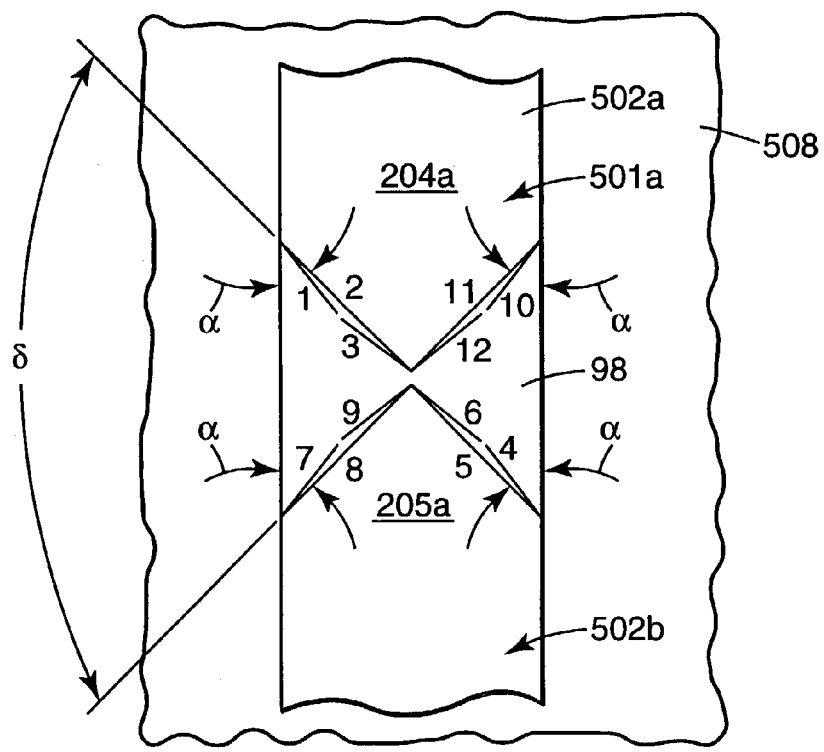
FIG. 19 is a top view of a first discrete length of decorative film tape applied to a surface of the sheet of release liner, illustrating a sequence of cuts that can be made in that first discrete length of tape by the second cutter of the tape head.

FIGS. 19 illustrates the first discrete length 501 a of decorative film tape adhered to the release liner 508 and a sequences of cuts 1–12 that can be made by the second cutter 154 to sequentially form the straight end surface portions 208, 209, 210, and 211 on new closely spaced end portions 204a and 205a of the display lengths 502a and 502b of decorative film tape made from that first applied discrete length 501a of decorative film tape, while leaving a scrap piece 98 of the applied discrete length 501a of decorative film tape between those new end portions 204a and 205a. The cuts in the sequence of cuts made to form the straight end surface portions 208, 209, 210, and 211 on the end portions 204a and 205a are identified by the reference numerals 1–12 in FIG. 19. The cuts (i.e., 1, 2, and 3 or 4, 5, and 6, etc.) that make one new straight end surface portion on the discrete length 501a of tape or on the discrete length 501b of tape are all made along the same straight line, however the illustrated path of the first and third cuts have been slightly separated from the second cut (which is along that straight line) to more clearly indicate the sequence of those cuts.

The tape head 100 is operated as follows to make the sequences of cuts 1–12 in the applied discrete length 501a of decorative film tape adhered to the release liner 508 as is illustrated in FIG. 19. With the second cutter 154 in its release position in which the blade 156 is spaced above the first applied discrete length 501a of decorative film tape adhered to the release liner 508, the tape head 100 is moved to position the blade 156 at the proper angle and in the middle of where the first straight end surface portion 208 on the end portion 204a will be formed. The second air cylinder 160 is then actuated to move the blade 156 of the second cutter 154 to its application position in contact the applied discrete length 501 a of decorative film tape. The tape head 100 is then moved toward the adjacent edge of the tape to make cut 1 at angle α (which as illustrated is about 45°) as the blade 156 rotates and cuts through the first applied discrete length 501a of decorative film tape. The tape head 100 is then moved in the opposite direction toward the center of that tape so that the rotating blade 156 makes cut 2 also at the angle α, and is then again moved in the opposite direction again toward the edge of that tape so that the rotating blade 156 makes cut 3 at angle α. The second cutter 154 is then moved by the air cylinder 160 to its release position out of contact with the applied discrete length 501a of decorative film tape while the tape head 100 is moved to position the blade 156 in the middle of where the end surface 209 on the second end portion 205a will be formed, which end surface 209 is parallel to the end surface 208 of the end portion 204a, but off set by a distance "b" (see FIG. 20) for reasons that will later be explained. The second air cylinder 160 is then again actuated to move the blade 156 of the second cutter 154 to its application position in contact the applied discrete length 501a of decorative film tape and the tape head 100 is moved toward the edge of that tape so that the rotating blade 156 makes cut 4 at angle α, is then moved in the opposite direction toward the center of that tape so that the rotating blade 156 makes cut 5 also at the angle α, and is then again moved in the opposite direction toward the edge of that tape so that the rotating blade 156 makes cut 6 at angle α. The second cutter 154 is then again moved by the air cylinder 160 to its release position with the blade 156 out of contact with the applied discrete length 501a of decorative film tape adhered to the release liner 508. The tape head 100 is then rotated through angle δ, which as illustrated is about 90°, and starts cutting a second end surface portion 210 on the second end portion 205a and a second end surface portion 211 on the first end portion 204a which is done with the sequence of cuts 7–12 that is performed in essentially the same manner as the sequence of cuts 1–6 described above.

Alternatively, a single blade could make a single cut instead of three individual cuts 1–3, 4–6, 7–9, or 10–12.

FIG. 20 illustrates the scrap portion 98 having a shape similar to that of a butterfly that is removed from the release liner 508 and from between the two display lengths 502a and 502b of decorative film tape made from the discrete length 501a of decorative film tape adhered to the release liner 508 when the end surface portions 208, 209, 210, and 211 on the new end portions 204a and 205a are cut by the second cutter 154 as described above. Those end surfaces 208, 209, 210, and 211 are disposed to form V-shaped notches adapted to receive end portions 204b and 205b cut by the second cutter 154 as described below with reference to FIGS. 21 and 22 to form display lengths 502c and 502d of decorative film tape from a second applied discrete length 501b of decorative film tape adhered to the release liner 508 transverse to the first applied discrete length 501a of decorative film tape after the scrap portion 98 was removed to give a visually pleasing intersection 220 between the end portions 204a, 205a, 204b, and 205b of those four display lengths 502a, 502b, 502c, and 502d of decorative film tape as is illustrated in FIG. 22.

FIGS. 21 illustrates the second discrete length 501b of decorative film tape applied and adhered by the tape applicator 10 to the release liner 508 and over the end portions 204a and 205a of the display lengths 502a and 502b of decorative film tape formed from the first applied discrete length 501a of decorative film tape with the longitudinal edges of the second discrete length 501b of decorative film tape at a 90° angle with respect to the longitudinal edges of the display lengths 502a and 502b of decorative film tape formed from the first applied discrete length 501a of decorative film tape and the second discrete length 501b of decorative film tape extending an equal distance along each of the display lengths 502a and 502b of decorative film tape. FIG. 21 also illustrates a sequence of cuts 1–12 that can be made in the second applied discrete length 501b of decorative film tape after it has been applied to the release liner 508 and over the end portions 204a and 205a to sequentially form the straight end surface portions 212, 213, 214, and 215 on the new end portions 204b and 205b of display lengths 502c and 502d of decorative film tape thereby formed from the second applied discrete length 501b of decorative film tape. That sequences of cuts 1–12 is essentially the same as the sequence of cuts 1–12 described above for forming the end surface portions 208, 209, 210, and 211 on the end portions 204a and 205a of the display lengths 206a and 207a of decorative film tape made from the first applied discrete length 501a of decorative film tape, and also leave a scrap piece 99 of the applied discrete length 501b of decorative film tape between those new end portions 204b and 205b.

FIG. 22 illustrates the second waste portion 99 (that has the same shape as the waste portion 98) after it has been removed by a user from the top of the end portions 204a and 205a on the display lengths 502a and 502b of decorative film tape and from between the end portions 204b and 205b of the two display lengths 502c and 502d formed from the second applied discrete length 501b of decorative film tape. Removing the second scrap portion 99 from the angled ends 204a and 205a completes the intersection 220 formed between the end portions 204a and 205a of the display lengths 502a and 502b of decorative film tape and the two end portions 204b and 205b of the display lengths 502c and 502d of decorative film tape. The end portions 204b and 205b have the same shape as the end portions 204a and 205a on the display lengths 502a and 502b of decorative film tape. The straight end surface portions 212 and 214 of the first end portion 204b and the straight end surface portions 213 and 215 of the second end portion 205b are each disposed at the angle α' relative to the length of the second applied discrete length 501b of decorative film tape.

There is an equal distance "b" between the opposing straight parallel end surface portions 208–212, 210–214, 209–213, 211–215 of the end portions 204a, 204b, 205a and 205b that provides space for thermal expansion of the display lengths 502a, 502b, 502c, and 502d. Without such a space, thermal expansion could cause end contact and resultant buckling of the display lengths 502a, 502b, 502c, and 502d of decorative film tape. That distance "b" can be between 0.005 inch and 0.12 inch or 0.013 cm and 0.3 cm, and preferably is around 0.01 inch or 0.025 cm.

The sequences of cuts 1–6 made by the second cutter 154 to form the intersections 220 cut through the discrete lengths 501a and 501b of decorative film tape, but preferably not through the release liner 508, although cuts in the release liner 508 can and do occur. The release liner 508 can be reinforced at such cuts in it by adhering a length of pressure sensitive adhesive coated tape over each cut in the release liner 508 on the surface of the release liner 508 opposite the display lengths 502a, 502b, 502c, and 502d of decorative film tape formed by those cuts.

The opposed end surface portions 208–212, 210–214, 209–213, 211–215 of the end portions 204a, 204b, 205a and 205b on the display lengths 502a, 502b, 502c, and 502d are cut to fit together to give a desired appearance for the intersection 220. Angles α and α', which are both 45° as illustrated (so that the end surface portions on each end portion are disposed at 90° with respect to each other) may be changed for a desired appearance of the intersection. For example, angle α may be 30° and angle α' may be 60°, or other combinations of angles for α and α' may be used.

The tape applicator 10 can be used to apply a plurality of discrete lengths 501 of the decorative film tape to the release liner 508 and to form a plurality of intersections 220 between those discrete lengths 501 in the manner illustrated in FIGS. 19 through 22 to form many decorative patterns including the decorative patterns for the laminates illustrated in FIGS. 1 and 6.

As an example, to form the pattern of display lengths 502 of decorative film tape illustrated in FIG. 1 the tape applicator 10 first sequentially applies two parallel discrete lengths 501a of decorative film tape along the length of the sheet of release liner 508. The tape applicator 10 then cuts those discrete lengths 501a of decorative film tape to form first and second end portions 204a and 205a for display lengths 501 of decorative film tape along the discrete lengths 501a of decorative film tape at the locations that intersections 220 are to be made by the steps described above with reference to FIGS. 19 and 20. The opposite ends of the two applied discrete lengths 501 a of decorative film tape are at 90° angles relative to the lengths of the tape, as cut by the first cutter 116. Alternatively, those opposite ends could also be cut obliquely to the lengths of the first applied discrete lengths 501a of decorative film tape by the second cutter 154 if that were desired. The tape applicator 10 then returns the head 100 to its "home position" along the support surface 22, as illustrated in FIG. 1, to allow a user to remove the scrap portions 98 of the first discrete lengths 501a of decorative film tape at each intersection 220 being formed along its length. Next, the tape applicator 10 moves the tape head 100 to sequentially apply five parallel discrete lengths 501b of decorative film tape transverse to the display lengths 502 of decorative film tape formed from the first two discrete lengths 501a of decorative film tape at a 90° angle to their edges and extending across the end portions 204a and 205a at the intersections 220. The tape applicator 10 then sequentially cuts those discrete lengths 501b of decorative film tape to form first and second end portions 204b and 205b for display lengths 501 of decorative film tape from the second discrete lengths 501 b of decorative film tape at the intersections 220 using the steps described above. Lastly, the tape head 100 returns to its "home position" to allow the operator to remove the scrap portions 99 thus formed at each intersection 220.

As a further example, to form the pattern of display lengths 502 of decorative film tape illustrated in FIG. 6 the tape applicator 10 first sequentially applies eight parallel discrete lengths 501 a of decorative film tape at an angle along the length of the sheet of release liner 508. The tape applicator 10 then cuts those discrete lengths 501a of decorative film tape to form first and second end portions 204a and 205a for display lengths of decorative film tape along the discrete lengths 501a of decorative film tape at the locations that intersections 220 are to be made by the steps described above with reference to FIGS. 19 and 20. The opposite ends of each applied discrete length 501a of decorative film tape is cut obliquely to the length of that applied discrete length 501a of decorative film tape by the second cutter 154. The tape applicator 10 then returns the head 100 to its "home position" along the support surface 22, as illustrated in FIG. 1, to allow a user to remove the scrap portions 98 of the first discrete lengths 501a of decorative film tape at each intersection 220 being formed along its length and at the opposite ends of the discrete lengths 501a. Next, the tape applicator 10 moves the tape head 100 to sequentially apply eight parallel discrete lengths 501b of decorative film tape transverse to the display lengths 502 of decorative film tape formed from the first two discrete lengths 501a of decorative film tape at a 90° angle to their edges and extending across the end portions 204a and 205a at the intersections 220, which discrete lengths 501b are long enough to also extend across the opposite ends of the discrete lengths 501a. The tape applicator 10 then uses the second cutter 154 to sequentially cut those discrete lengths 501b of decorative film tape to form first and second end portions 204b and 205b for display lengths 501 of decorative film tape from the second discrete lengths 501b of decorative film tape at the intersections 220 using the steps described above, and to cut opposite ends of each applied discrete length 501a of decorative film tape obliquely to the length of that applied discrete length 501a of decorative film tape to form ends for display lengths 501 that are closely spaced from the ends of display lengths formed from the first discrete lengths 501a of decorative film tape. Lastly, the tape head 100 returns to its "home position" to allow the operator to remove the scrap portions 99 thus formed at each intersection 220 and at each end of the applied discrete length 501a of decorative film tape.

FIGS. 1 and 6 are only illustrative of patterns of display lengths of decorative film tape that can be adhered to a sheet of release liner by the tape applicator 10 in the method according to the present invention for making a laminate according to the present invention. The tape applicator 10 may create almost any pattern of straight display lengths of decorative film tape on a sheet of release liner because of the versatility with which the tape head 100 can be moved across the support surface 22 to apply discrete lengths of decorative film tape at any angle along a release liner on the support surface 22, and (if necessary) to cut the applied discrete lengths of decorative film tape at any angle after they have been applied to the release liner to form the display lengths from those applied discrete lengths.

The tape applicator 10 includes a computer processor and a controller for sending appropriate signals to the actuators 30, 32, 34 to move the tape head 100 relative to the support surface 22 and to operate the tape head 100 as necessary to form a desired pattern of display lengths of the decorative film tape on a sheet of release liner. For example, an operator may want to make the pattern of display lengths of decorative film tape on a sheet of release liner illustrated in either FIG. 1 or FIG. 6. The operator enters a set of commands into the computer processor that indicate the shape of the pattern to be made. The computer processor and controller then determines which way to direct the actuators 30, 32, 34 to move the tape head 100 to apply the discrete lengths of decorative film tape to the release liner and to cut the applied discrete lengths of decorative film tape after they have been applied to the release liner to form the display lengths of decorative film tape. The computer processor and controller can include an "open loop" system, which calculates where the tape head 100 is located on the tabletop 21, based on a known series of moves. For example, the ball screw in either the x-axis actuator 30 or y-axis actuator 32 will move the tape head 100 a known distance per one rotation of the ball screws. If the computer processor knows the initial location of the tape head 100, like the "home position" for instance, it can determine where the final location of the tape head 100, based on how many rotations the ball screw in the actuator actually rotated. The computer processor will send a signal to the x-axis and y-axis actuators 30, 32 to turn the ball screws a certain number of rotations to move the tape head 100 a certain distance in a particular axis. The computer processor can also send signals to the rotary actuator 36 indicating where and when to rotate the tape head 100 around an axis parallel to the z-axis of the support surface 22. A suitable controller is a controller sold under the trade name Compumotor, which is commercially available from Braas Company located in St. Paul, Minn., sold under part number 6K4. Alternatively, the computer processor could include a "closed loop" system, which calculates where the tape head 100 is at all times on the support surface 22 of the tabletop 21.

The actuators 30, 32, 34 include sensors to determine the initial location of the tape head 100 on the tabletop 21. Suitable sensors for the actuators 30, 32, 34 are Prox Sensors sold under the trade name Omron, which is commercially available from Braas Company located in St. Paul, Minn., sold under part number E2E-X1R5E1-M1-N.

The methods and structures according to the present invention have now been described with reference to several embodiments and modifications thereof The foregoing detailed description and examples have been given for clarity of understanding only. No unnecessary limitations are to be understood from them. All patents and patent applications cited herein are hereby incorporated by reference.

It will be apparent to those skilled in the art that many changes can be made in the methods and embodiments described without departing from the scope of the invention. For example, the tape applicator 10 could be modified and used in an alternative method for forming essentially the same laminate 500 described above from the same layer of pre-mask material 510, supply length 92 of decorative film tape, and release liner 508 described above by supporting the layer of pre-mask material 510 with the surface of its layer 512 of removable adhesive opposite its cover layer 511 in the application plane, and using the tape applicator 10 to form display lengths 502 of decorative film tape of different predetermined lengths and end shapes from the supply length 92 of decorative film tape and to apply those display lengths 502 of decorative film tape to the surface of the layer 512 of removable adhesive in a predetermined pattern in the manner described above with longitudinal edges of the display lengths 502 of tape extending along predetermined edge locations, the pattern of application including aligned closely spaced ends for at least some of the applied display lengths 502 of decorative film tape, and then pressing the release liner 508 against the layers 509 of aggressive adhesive in the display lengths 502 of decorative film tape and the portions of the layer 512 of removable adhesive included in the layer of pre-mask material 510 that are exposed around the display lengths 502 of decorative film tape. Modifications of the tape applicator 10 so that it could be used in this method would comprise changing the positions of the fixed blade 112 and the moveable blade 114 of the first cutter 116, and positioning the liner take-up roller 136 including its friction clutch 138 and the motor 137 by which it is driven through the speed reducer 139 on the opposite side of the tape path, together with providing an application surface 121 on the roller 120 that would not adhere to the layer 509 of pressure sensitive adhesive on the supply length 92 of decorative film tape.

All of the patents and patent applications disclosed herein, including those set forth in the Background of the Invention, are hereby incorporated by reference. Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention. Thus, the scope of the present invention should not be limited to the structures described in this application, but only by the structures described by the language of the claims and the equivalents of those structures.

What is claimed is:

1. A laminate from which decorative films can be precisely applied to a substrate, the laminate comprising:
    a polymeric cover sheet having opposite outer and inner major surfaces and being free of passageways between said major surfaces;
    a layer of structured pressure sensitive adhesive having opposite major surfaces and edges extending between said major surfaces, one of said major surfaces of said layer of structured pressure sensitive adhesive being adhered to the inner major surface of the cover sheet, said layer of structured pressure sensitive adhesive having a plurality of spaced passage ways extending to at least one edge of the layer of structured pressure sensitive adhesive;
    one or more pieces of a decorative film having opposite major surfaces with one of the major surfaces of the decorative film being adhered to the major surface of the layer of structured pressure sensitive adhesive opposite said cover sheet;
    a second layer of pressure sensitive adhesive coextensive only with each of the pieces of decorative film having opposite major surfaces with one of the major surfaces of the second layer of pressure sensitive adhesive adhered to the major surface of the decorative film opposite the layer of structured pressure sensitive adhesive; and
    a release liner extending substantially across the major surface of the second layer of pressure sensitive adhesive opposite the decorative film and a portion of the major surface of the layer of structured pressure sensitive adhesive opposite the cover sheet.

2. The laminate of claim 1 wherein the structured pressure sensitive adhesive is adapted to be made wet during application of the decorative film to a substrate with a liquid that lubricates the adhesives so that the decorative film can be applied to a substrate at a precise position.

3. The laminate of claim 1 wherein said layer of structured pressure sensitive adhesive has about 3 to about 71 passageways per centimeter measured along the major surfaces of said layer of structured pressure sensitive adhesive.

4. The laminate of claim 1 wherein the passageways have widths of about 50 micrometers to about 200 micrometers.

5. The laminate of claim 1 wherein the passageways have heights in the range of about 15 micrometers to about 45 micrometers.

6. The laminate of claim 1 wherein the passageways are in one of a regular pattern or an irregular pattern.

7. The laminate of claim 1 wherein the passageways are in one of a rectangular grid of passageways, a diamond grid of passageways, or a plurality of parallel passageways.

8. The laminate of claim 1 wherein the decorative film comprises an optical film with light-diffusing features that provide a beveled or v-groove cut glass appearance when adhered to a glass panel.

9. The laminate of claim 1 wherein the structured pressure sensitive adhesive is selected to form a bond to the decorative film that permits the release liner to be peeled away without disrupting that bond and to permit the cover sheet to be peeled cleanly from the decorative film without disrupting the adhesive bond between the decorative film and a substrate.

10. The laminate of claim 1 wherein the cover sheet comprises an opaque material.

11. A laminate adapted for use to decorate a substrate comprising:
    a layer of pre-mask material comprising a cover layer having opposite major surfaces and being free of passageways between said major surfaces, and a layer of removable structured pressure sensitive adhesive having opposite major surfaces and edges extending between said major surfaces, one of said major surfaces of said layer of removable structured pressure sensitive adhesive being firmly adhered to one of said major surfaces of the cover layer, said layer of removable structured pressure sensitive adhesive having passageways extending to at least one edge of the layer of structured pressure sensitive adhesive;
    one or more display lengths of a decorative film, the display lengths each comprising opposite first and second major surfaces and a layer of adhesive along the second major surface, the first major surface of the decorative film being adhered to the major surface of the layer of structured pressure sensitive adhesive opposite the cover layer; and
    a release liner extending across the major surface opposite the decorative film of the layer of adhesive on the second major surface of the decorative film and across a portion of the major surface of the layer of structured pressure sensitive adhesive opposite the cover layer.

* * * * *

UNITED STATES PATENT AND TRADEMARK OFFICE
CERTIFICATE OF CORRECTION

PATENT NO.     : 6,984,429 B2
DATED          : January 10, 2006
INVENTOR(S)    : Thunhorst, Kristin L.

It is certified that error appears in the above-identified patent and that said Letters Patent is hereby corrected as shown below:

Column 1,
Line 66, delete "pro-mask" and insert -- pre-mask --.

Column 2,
Line 13, delete "plating" and insert -- placing --.

Column 8,
Linr 58, after "thereof" insert -- . --.

Column 12,
Line 10, delete "Conning" and insert -- forming --.
Line 28, delete "bead" and insert -- head --.

Column 18,
Line 10, delete "cuffing" and insert -- cutting --.

Column 20,
Lines 1 and 34, delete "501 a" and insert -- 501a --.

Column 22,
Line 57, delete "501 a" and insert -- 501a --.

Column 23,
Line 18, delete "501 a" and insert -- 501a --.

Column 24,
Line 54, after "thereof" insert -- . --.

UNITED STATES PATENT AND TRADEMARK OFFICE
CERTIFICATE OF CORRECTION

PATENT NO. : 6,984,429 B2
DATED : January 10, 2006
INVENTOR(S) : Thunhorst, Kristin L.

It is certified that error appears in the above-identified patent and that said Letters Patent is hereby corrected as shown below:

Column 25,
Line 56, delete "passage ways" and insert -- passageways --.

Signed and Sealed this

Eighteenth Day of April, 2006

JON W. DUDAS
*Director of the United States Patent and Trademark Office*